(12) United States Patent
Southard

(10) Patent No.: US 9,314,980 B2
(45) Date of Patent: Apr. 19, 2016

(54) HIGH CORRECTABILITY DEFORMABLE MIRROR

(71) Applicant: GOODRICH CORPORATION, Charlotte, NC (US)

(72) Inventor: Bari M. Southard, Bridgewater, CT (US)

(73) Assignee: GOODRICH CORPORATION, Charlotte, NC (US)

(*) Notice: Subject to any disclaimer, the term of this patent is extended or adjusted under 35 U.S.C. 154(b) by 92 days.

(21) Appl. No.: 13/847,363

(22) Filed: Mar. 19, 2013

(65) Prior Publication Data

US 2014/0285880 A1    Sep. 25, 2014

(51) Int. Cl.

| | |
|---|---|
| *G02B 5/08* | (2006.01) |
| *G02B 7/182* | (2006.01) |
| *B29D 11/00* | (2006.01) |
| *G02B 7/185* | (2006.01) |
| *G02B 26/06* | (2006.01) |
| *G02B 26/08* | (2006.01) |
| *G02B 7/183* | (2006.01) |

(52) U.S. Cl.
CPC .......... *B29D 11/00596* (2013.01); *G02B 7/182* (2013.01); *G02B 7/183* (2013.01); *G02B 7/185* (2013.01); *G02B 26/06* (2013.01); *G02B 26/0825* (2013.01)

(58) Field of Classification Search
CPC ........ G02B 23/00; G02B 23/06; G02B 26/00; G02B 6/3578; G02B 6/3574; G02B 6/357; G02B 6/3572; G02B 6/3538; G02B 7/18; G02B 7/182; G02B 7/185; G02B 26/06; G02B 26/08; G02B 26/0825; G02B 26/0841; G02B 26/10

USPC ........ 359/364, 846, 847, 838, 849, 851, 868, 359/224.1, 291, 399

See application file for complete search history.

(56) References Cited

U.S. PATENT DOCUMENTS

| | | | | |
|---|---|---|---|---|
| 3,912,380 | A | * 10/1975 | Klein ............... | B29D 11/00596 359/848 |
| 4,588,268 | A | * 5/1986 | Aldrich .................. | 359/849 |
| 4,655,563 | A | * 4/1987 | Plante et al. .................. | 359/849 |
| 4,932,768 | A | 6/1990 | Gobeli | |
| 4,944,580 | A | * 7/1990 | MacDonald et al. ......... | 359/849 |
| 5,089,915 | A | 2/1992 | Gobeli | |
| 5,157,556 | A | * 10/1992 | Hugenell ................. | G02B 5/10 250/201.1 |

(Continued)

FOREIGN PATENT DOCUMENTS

EP         1376183 A2         1/2004

OTHER PUBLICATIONS

Lubliner, Jacob et al.; Stressed mirror polishing. 1: A technique for producing nonaxisymmetric mirrors, Applied Optics / vol. 19, No. 14 / 15 Jul. 1980, pp. 2332-2340.

(Continued)

*Primary Examiner* — Bumsuk Won
*Assistant Examiner* — Collin X Beatty
(74) *Attorney, Agent, or Firm* — Cantor Colburn LLP

(57) ABSTRACT

A telescope, mirror assembly and method of forming an aspheric mirror is disclosed. The telescope includes the mirror assembly which has a substantially spherical surface contour in a relaxed state. A plurality of actuators distributed substantially along an outer edge of the mirror is configured to apply a load to the mirror assembly to deform the mirror to obtain a substantially aspheric surface contour.

20 Claims, 21 Drawing Sheets

(56) References Cited

U.S. PATENT DOCUMENTS

| | | | |
|---|---|---|---|
| 5,265,034 A * | 11/1993 | Breckenridge et al. | 250/201.1 |
| 5,414,564 A * | 5/1995 | Pausch et al. | 359/846 |
| 5,552,006 A * | 9/1996 | Soliday | B29C 55/10 156/108 |
| 5,831,780 A * | 11/1998 | Krim | G02B 26/0825 248/576 |
| 5,986,795 A | 11/1999 | Chapman et al. | |
| 6,226,121 B1 * | 5/2001 | Atkinson et al. | 359/399 |
| 6,398,373 B1 | 6/2002 | Guzman et al. | |
| 6,678,097 B2 * | 1/2004 | McKenney | 359/742 |
| 6,952,304 B2 * | 10/2005 | Mushika et al. | 359/295 |
| 7,374,302 B2 * | 5/2008 | Griffith et al. | 359/849 |
| 8,511,842 B1 * | 8/2013 | Sacco | 359/846 |
| 2003/0147161 A1 * | 8/2003 | Shiraishi | G02B 7/182 359/846 |
| 2004/0085657 A1 * | 5/2004 | Gullapalli et al. | 359/849 |
| 2004/0125472 A1 * | 7/2004 | Belt | 359/847 |
| 2004/0201908 A1 * | 10/2004 | Kaneko | 359/847 |
| 2005/0046976 A1 * | 3/2005 | Ealey | 359/846 |
| 2006/0221473 A1 * | 10/2006 | Oshima et al. | 359/871 |
| 2006/0232846 A1 * | 10/2006 | Himmer et al. | 359/224 |
| 2006/0250672 A1 * | 11/2006 | Ealey | G02B 7/182 359/290 |
| 2008/0144199 A1 * | 6/2008 | Schoeppach et al. | 359/824 |
| 2010/0202071 A1 * | 8/2010 | Preumont et al. | 359/849 |
| 2010/0231882 A1 * | 9/2010 | Dinger et al. | 355/67 |
| 2012/0170134 A1 * | 7/2012 | Bolis et al. | 359/666 |
| 2013/0070355 A1 * | 3/2013 | Hugot | G02B 26/0825 359/849 |
| 2013/0176628 A1 * | 7/2013 | Batchko et al. | 359/665 |
| 2014/0022632 A1 * | 1/2014 | Theriault | 359/419 |

OTHER PUBLICATIONS

Burge, J. et al.; "NGST Mirror System Demonstrator from the University of Arizona", Proceeding of SPIE, vol. 4451, 2001, pp. 27-38.

Zeng, Chunmei et al.; "Demonstration of shaping an aspheric from an ultra-thin spherical mirror using active supports", Proceedings of SPIE, vol. 7655, 2010, pp. 76552N-1-76552N-8.

EP Search Report; EP Application No. EP14160291; Date of Mailing: Jun. 26, 2014; pp. 1-9.

Langlois, M. P. et al.; "High order adaptive optics system with a high density spherical membrane deformable mirror", Proceedings of SPIE, vol. 3762, Jul. 1999, pp. 50-57.

Zeng, Chunmei et al.; "Analysis of deforming a 1.5-m ultra-thin spherical mirror into an off-axis parabola", Proceedings of SPIE, vol. 8415, 2012, pp. 84151B-1-84151B-5.

European Office Action for application No. EP14160291.2; Mailing Date Dec. 2, 2015, 6 pages.

* cited by examiner

Output Set: Residual Error
Contour: Residual Error 1-G X

Output Set: Mode 1.90.86272 Hz
Deformed(5.418): Total Translation

Output Set: 1-G Y
Contour: Plate Top MajorPm Stress

Output Set: 1-G Z
Contour: Plate Top MajorPm Stress

HIGH CORRECTABILITY DEFORMABLE MIRROR

BACKGROUND

The present disclosure relates to a means of fabricating aspheric (non-spherical) mirrors to be used in modern reflective telescopes for either ground- or space-based applications. Reflective telescopes use mirrors to collect and focus light to an image, while refractive telescopes use lenses rather than mirrors. Reflective telescopes generally produce higher quality images than refractive telescopes when used over a wide range of optical wavelengths. They are also considerably lighter than refractive telescopes for large telescope apertures. Many modern ground-based telescopes have apertures that exceed several meters. The Hubble Space Telescope has an aperture of approximately 2.5 meters. Lenses of sufficient optical quality are not available in such large sizes, and their weight would be prohibitive. Therefore, the manufacture of large aspheric mirrors for modern telescopes has been an area of extensive development for several decades.

The fabrication of aspheric mirrors by conventional grinding and polishing techniques is time-consuming and expensive. The reason for this is the fact that an aspheric mirror has a local curvature that varies as a function of position on the mirror. A spherical mirror, on the other hand, has a constant curvature over its entire surface. Grinding and polishing of a spherical mirror can be accomplished by using a large tool that contacts the full aperture of the mirror. With an abrasive substance located between the tool and the mirror, the tool is stroked back-and-forth across the surface of the mirror in order to remove material. The nature of the abrasive material and the pressure used is varied as the mirror shape converges to the desired shape. When an aspheric mirror is ground and polished, however, a large tool cannot be used since it cannot match the mirror's contour as the tool is stroked across the mirror. Consequently, the tool size must be decreased to the point where the mismatch in shape between the mirror and tool is acceptable over the extent of the stroke used. This significantly reduces the rate at which material can be removed from the mirror, adding considerable time, and therefore cost, to the fabrication of the mirror. The subject invention offers a new approach to the fabrication of aspheric mirrors that leverages the fact that spherical mirrors can be efficiently fabricated by conventional means.

SUMMARY

According to one embodiment of the present disclosure, a method of forming an aspheric mirror includes: manufacturing a mirror having a substantially spherical surface contour; and applying a plurality of radial and axial forces and radial and tangential moments distributed substantially along an outer edge of the mirror such that the mirror is deformed to a substantially aspheric surface contour.

According to another embodiment of the present disclosure, a mirror assembly includes: a mirror having a substantially spherical surface contour in a relaxed state; and a plurality of actuators distributed substantially along an outer edge of the mirror, each of the plurality of actuators configured to apply radial and axial forces and radial and tangential moments to deform the mirror to a substantially aspheric surface contour.

According to another embodiment of the present disclosure, a telescope includes: a mirror having a substantially spherical surface contour in a relaxed state; and a plurality of actuators distributed substantially along an outer edge of the mirror, each of the plurality of actuators configured to apply radial and axial forces and radial and tangential moments to deform the mirror to a substantially aspheric surface contour.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 31:
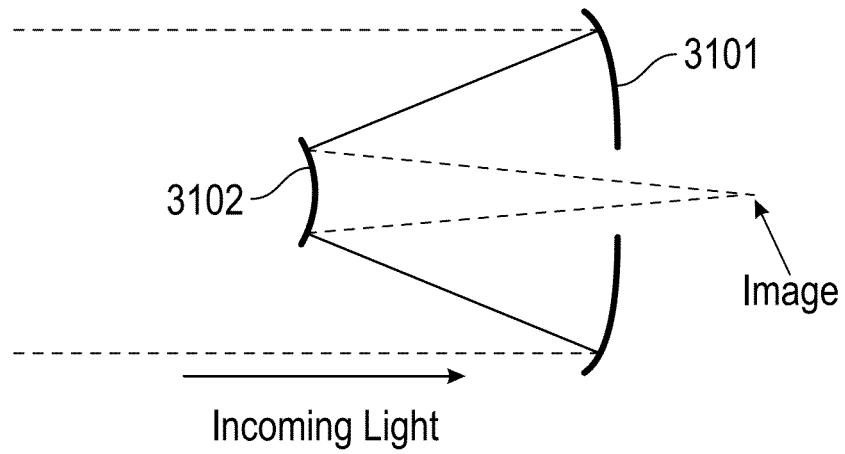
FIG. 31 (Prior Art) shows an exemplary Cassegrain telescope.
Figure 32:
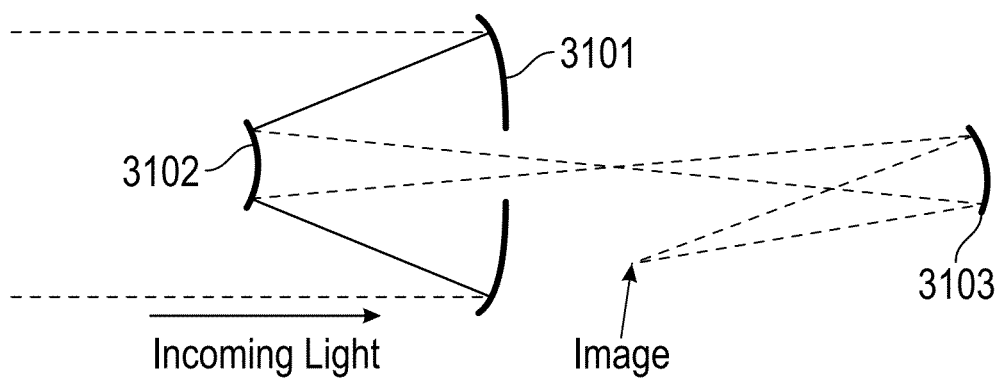
FIG. 32 (Prior Art) shows a 3-mirror telescope form of the Cassegrain telescope of FIG. 31.

One of the most basic telescope optical designs is the Cassegrain telescope, as illustrated in FIG. 31 (Prior Art). This 2-mirror telescope consists of a concave primary mirror 3101, which is a paraboloid of revolution, and a convex secondary mirror 3102, which is a hyperboloid of revolution. Imagery over a wider angular field-of-view than can be obtained with a Cassegrain telescope can be obtained with a 3-mirror telescope form, such as that shown in FIG. 32 (Prior Art). Here, the secondary mirror 3102 is a hyperboloid and the tertiary mirror 3103 is an ellipse, both of which are conic sections. The primary mirror 3101, however, while close in shape to a paraboloid, is not exactly a paraboloid. Therefore, it is not a conic section, and is often referred to as a generalized aspheric mirror. The subject invention addresses a means for fabricating aspheric mirrors, either conic sections or more generalized aspheric mirrors.

Figure 33:
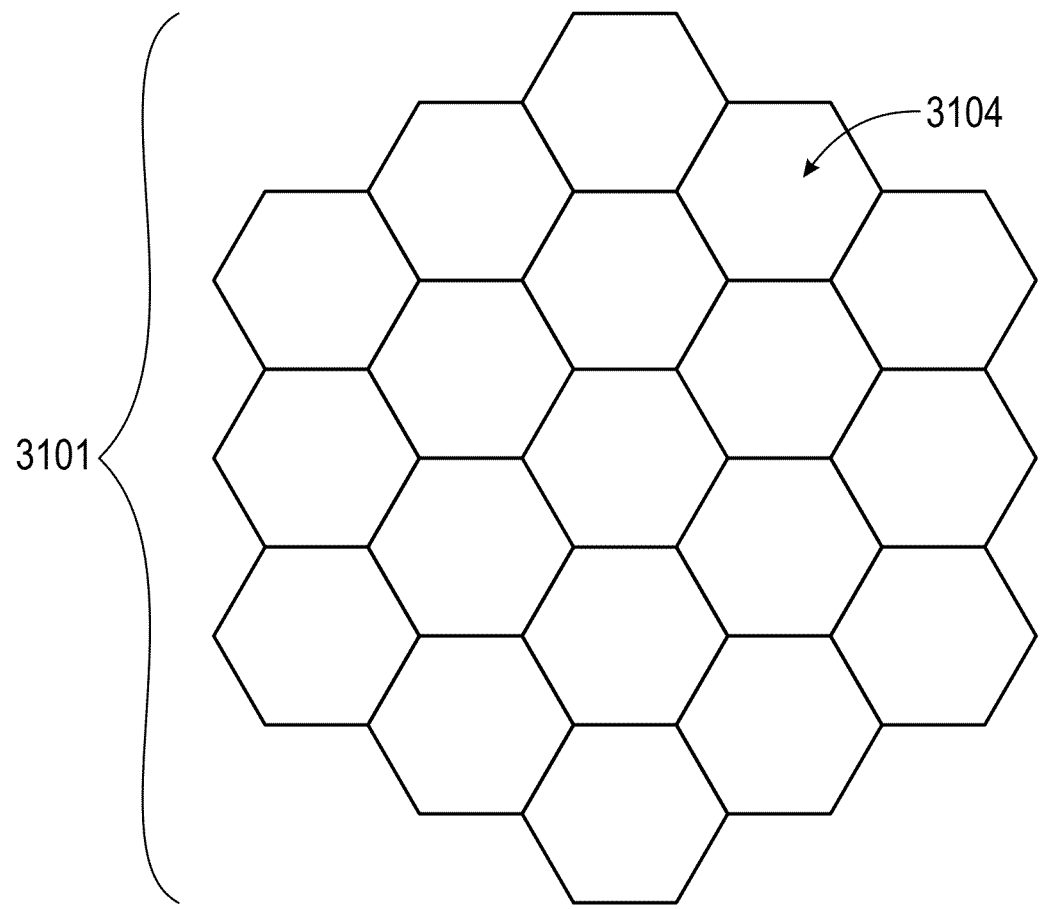
FIG. 33 (Prior Art) show. a primary mirror synthesized using an array of hexagonal segments.
Figure 34:
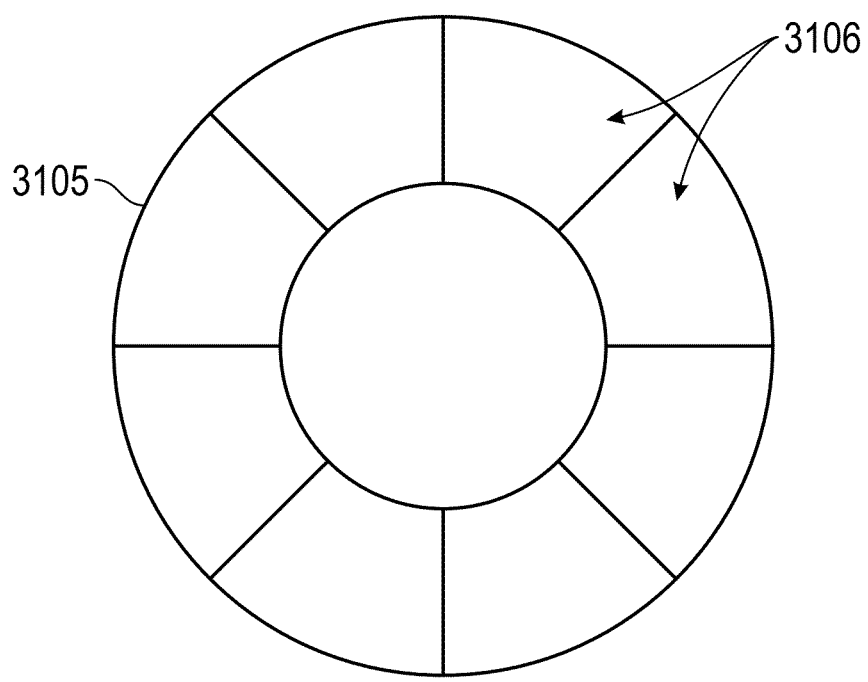
FIG. 34 (Prior Art) shows an annular primary mirror divided into equal segments.

The contour of the surface of a mirror with rotational symmetry, z being the axis of revolution, can be written as:

$$Z=cS^2/\{1+[1-(K+1)c^2S^2]^{1/2}\}+A_1S^4+A_2S^6+A_3S^8+A_4S^{10}$$

where $S^2=x^2+y^2$ and $c=1/$radius of curvature. Also, $A_1, A_2, A_3$ and $A_4$ are the aspheric deformation constants and K is a function of the eccentricity (e) of a conic surface ($K=-e^2$), called the conic constant. If the $A_i$ are all zero, the surface is a conic surface of revolution, according to the following:

Hyperboloid: $K<-1$
Paraboloid: $K=-1$
Ellipse rotation about its major axis (prolate spheroid): $-1<K<0$
Sphere: $K=0$
Ellipse rotation about its mirror axis (oblate spheroid): $K>0$ As the requirements for telescope aperture diameter have been increasing, either to achieve better resolution or to collect more light, the need has arisen to synthesize the primary mirror with a set of mirror segments. One purpose of segmentation is to reduce weight, a critical factor in space-based telescopes. For ground-based telescopes, there is also a practical limit to the size of a monolithic mirror blank that can be provided by glass manufacturers. Mirror weight and transportation issues are also important factors that limit the practical size of monolithic mirrors. FIGS. 33 and 34 (Prior Art) illustrate different approaches to segmentation of primary mirrors. In FIG. 33, the primary mirror 3101 is synthesized with an array of hexagonal segments 3104. In FIG. 34, an annular ring 3105 is divided equally into segments 3106. Since none of the segments in the annular ring are centered on the optical axis of the telescope, each segment is said to be an off-axis aspheric segment.

In order for a segmented mirror to function properly, the individual segments must conform to the shape of the theoretical primary mirror that is being synthesized. Furthermore, they must be properly aligned in 6 degrees-of-freedom to one another, with some tolerances on the order of 10's of nanometers. In order to implement the required alignment, segmented telescopes are said to be active, and include actuators to move the segments into the correct positions. Various means of sensing telescope performance are used to optimize segment alignment. Furthermore, some telescope designs use mirror segments that are deformable, allowing the surface contour of each segment to be adjusted accordingly to optimize telescope imaging performance. The subject invention addresses a means of providing a deformable mirror segment that can be fabricated in a fashion that is much less time-consuming and costly than more conventional approaches to the fabrication of mirror segments. The invention may also be used for fabrication of an aspheric, monolithic mirror.

A major challenge of the past has been the timely and economical manufacture of lightweight aspheric mirrors, particularly large off-axis mirrors used for segmented telescopes. Embodiments of the present invention are based on a use of actuators to deform a thin spherical meniscus mirror to the required aspheric shape. The systems and methods disclosed herein provide ultra-correctability with relatively few actuator-to-mirror interface points, may avoid a need to polish aspheric mirrors, which can be time-consuming and expensive, may avoid expensive tooling and processes, and may provide low mass and low cost.

In one embodiment, a thin spherical meniscus can be deformed with edge loading to achieve the shape of an off-axis section of a paraboloid with remarkable accuracy and correctability. This is an important result, considering that spheres are far easier to manufacture than aspheres. One embodiment described herein deforms a spherical meniscus to an off-axis aspheric segment with much less residual error than has been demonstrated previously. This method may be applied to off-axis segments, as well as other mirror prescriptions.

Figure 1:
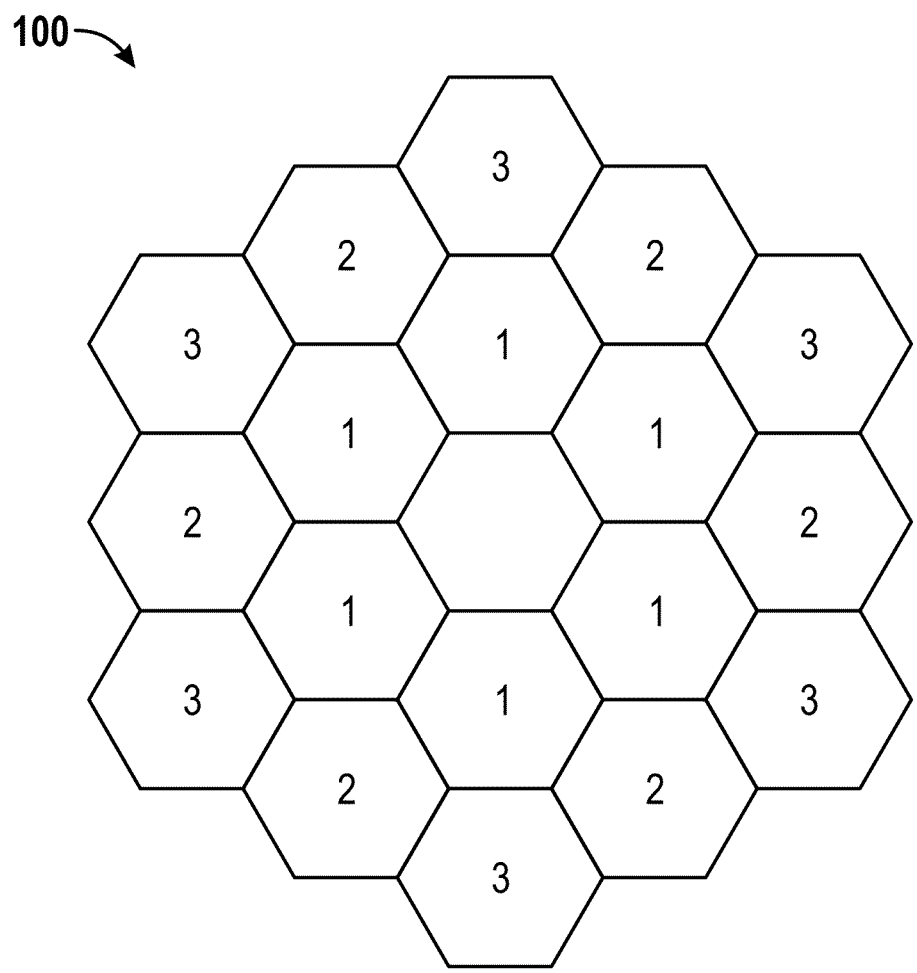
FIG. 1 shows an exemplary segmented mirror 100 that may be used in a suitable optical application such as a primary mirror of an optical telescope.

FIG. 1 shows an exemplary segmented mirror 100 that may be used in a suitable optical application such as a primary mirror of an optical telescope. The segmented mirror 100 includes a plurality of mirror segments. The mirror segments may be separately produced to improve mirror precision and efficiency during the manufacturing process and then assembled to form the mirror 100. Such manufacturing methods generally produce a lightweight mirror structure that can be altered or fixed at low cost. In an exemplary embodiment, mirror segments have a hexagonal outline or contour in order to fit into a lattice structure; in general segments of any planform may be used. The assembled mirror segments are labeled 1, 2 and 3 to indicate their distance from the central axis of the mirror, with mirror segments labeled 1 being closest to the central axis and mirror segments labeled 3 being farthest from the central axis. The assembled mirror 100 may form a curved surface. Thus, the shape of the reflective surface of a selected mirror segment is related to its distance to the central axis. The shape of the reflective surface may be determined mathematically. In an exemplary embodiment, the reflective surface for an off-axis mirror segment is aspheric. In an exemplary embodiment, the present disclosure provides methods for applying loads to the reflective surface of a mirror segment to deform the reflective surface from an initial spherical shape in its load-free state to an aspheric reflective surface. In an alternate embodiment, the initial load-free shape of the mirror segment may be a cylindrical surface.

Figure 2:
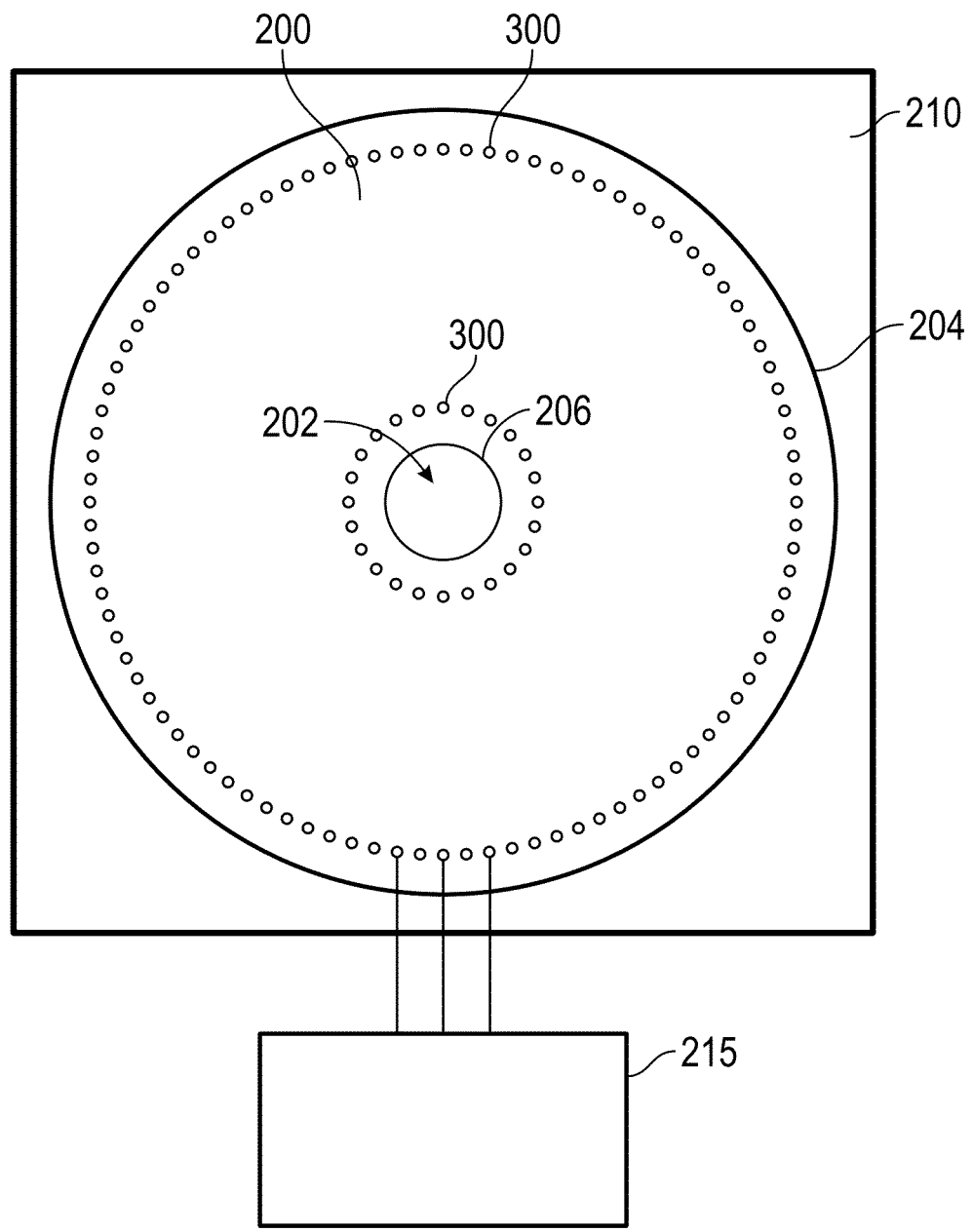
FIG. 2 shows an exemplary surface of a spherical mirror in a relaxed state.
Figure 3:
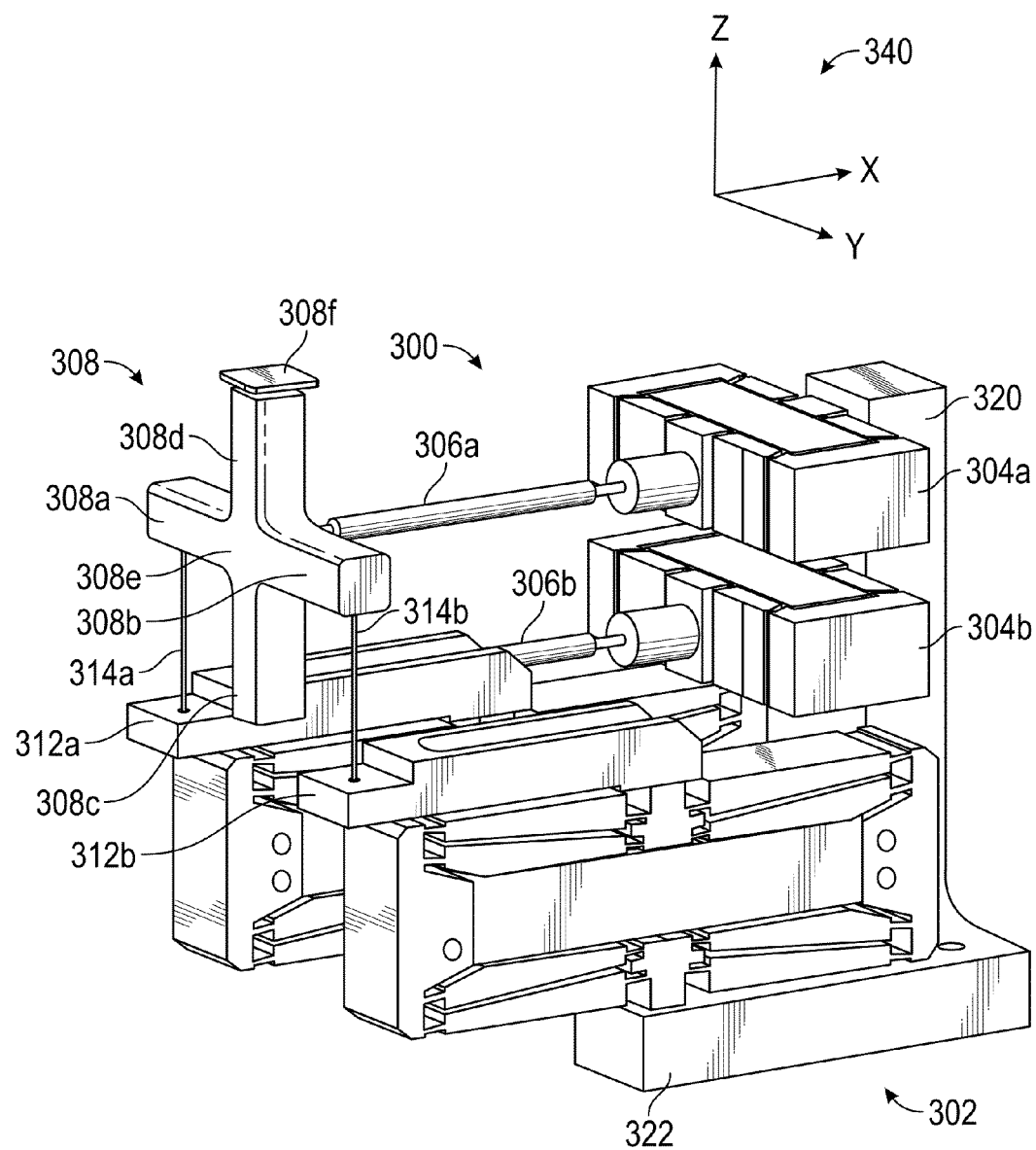
FIG. 3 shows an exemplary actuator assembly that is suitable for deforming the surface of a mirror.

FIG. 2 shows an exemplary surface of a spherical mirror 200 in a relaxed state. The mirror 200 may have a circular contour in one embodiment. Other contours, including a hexagonal contour, may also be used. The mirror 200 may have a central circular hole 202 located at the center of the mirror 200. Thus, the mirror 200 has an outer edge 204 and an inner edge 206. In an exemplary embodiment, at least one actuator assembly 300 may be coupled to an edge of the mirror 200. The at least one actuator assembly 300 may be further attached to a mirror backing or mirror support 210 which allows an action produced by the at least one actuator assembly 300 to result in an applied load at the mirror 200. In exemplary embodiments, a plurality of actuator assemblies 300 may be coupled to the mirror 200 along the outer edge or circumference of the mirror 200. Additionally, actuator assemblies 300 may be coupled to the mirror 200 along the inner edge 206 created by the central hole 202. The number of actuator assemblies 300 shown in FIG. 3 is for illustrative purposes only. In an exemplary embodiment, 114 actuators are placed along the mirror 200 with 92 actuators located along an outer circumferential edge of the mirror and 22 actuators located along an inner edge of the mirror segment. The number of actuators is not to be considered a limitation of the invention.

Each actuator assembly 300 may be configured to apply a load to the mirror 200 at a point of contact between the actuator assembly 300 and the mirror 200. In an exemplary embodiment, each actuator assembly 300 may be configured to apply radial and axial forces and radial and tangential moments to the mirror 200 at a point of contact between the actuator assembly 300 and the mirror 200. The applied radial and axial forces and radial and tangential moments are discussed below with respect to FIG. 4. A control unit 215 as shown in FIG. 2 may be used to individually activate the actuator assemblies 300 to achieve a selected applied load and thus to achieve a selected reflected surface of the mirror 200. In FIG. 2, control unit 215 is shown to be coupled to three of the actuators 300 for illustrative purposes only. In an exemplary embodiment, the control unit 215 may be coupled to all of the actuators to control applied loads at the outer edge 204 and the inner edge 206 of the mirror 200. The control unit 215 may activate the actuators 300 based on the equations described herein for applying a load to the edge or the mirror.

FIG. 3 shows an exemplary actuator assembly 300 that is suitable for deforming the surface of an exemplary mirror. The exemplary actuator 300 includes a base 302 that is attached to a backing surface such as the mirror support 210 of FIG. 2. The base 302 includes at least a vertical support 320 and a horizontal support 322. For illustrative purposes only, the actuator assembly is aligned along coordinate system (x,y,z) 340 with vertical support 320 aligned along the z-axis and horizontal support 322 aligned along the x-axis. The base 302 may support a plurality of actuators 304a, 304b, 310a and 310b that may be activated to produce a deformation at the mirror. In an exemplary embodiment, the actuators produce motion via applying an electrical current to a piezoelectric element that expands or contracts accordingly.

Vertical support 320 supports a set of actuators 304a, 304b. Actuator 304a generates a linear motion on flexure, rod or piston 306a. An end of the piston 306a extended away from the actuator 304a is coupled to a mirror coupling device 308. The mirror coupling device 308 may be in a shape of a cross, having a left horizontal arm 308a, right horizontal arm 308b, lower vertical arm 308c and upper vertical arm 308d. The horizontal arms 308a and 308b and the vertical arms 308c and 308d intersect at the intersection 308e. Additionally, the mirror coupling device 308 includes a face 308f at which the coupling device 308 may be coupled to the exemplary mirror. The piston 306a may be coupled to the coupling device 308 at the intersection 308e. Actuator 304b is vertically displaced from the actuator 304a and generates linear motion on piston 306b. The piston 306b may be coupled to the lower vertical arm 308c of the mirror coupling device 308. The linear actuators 304a and 304b are oriented to move their respective pistons 306a and 306b along the x-axis of the coordinate system 340.

When pistons 306a and 306b are both moved in a positive x-direction, the mirror coupling device 308 moves in a positive x-direction, thereby moving the attaching face 308f of the mirror coupling device 308 in the positive x-direction. This motion thereby generates a force on the attached mirror along the positive x-direction. Similarly, when pistons 308a and 308b are both moved in a negative x-direction, a force is generated on the attached mirror along the negative x-direction.

Moving piston 306a in a positive x-direction while moving piston 306b in a negative x-direction generates a moment or torque at the attaching face 308f about the y-axis. Similarly, moving piston 308a in a negative x-direction while moving piston 306b in a positive x-direction generates an opposite moment at the attaching face 308f about the y-axis. In various embodiments, the axis of rotation, pivot or fulcrum of these moments or torques is located substantially at the attaching face 308f.

Horizontal support 322 supports actuators 312a and 312b. Actuator 312a generates a linear motion on flexure, rod or piston 314a. An end of the piston 314a away from the actuator 312a is coupled to the coupling device 308 at the left horizontal arm 308a. Actuator 312b generates linear motion on rod or piston 312b. An end of the piston 314b away from the actuator 312b is coupled to the right horizontal arm 308b.

When pistons 314a and 314b are both moved in a positive z-direction, the mirror coupling device 308 moves in a positive z-direction, thereby moving the attaching face 308f of the mirror coupling device 308 in the positive z-direction. This motion thereby generates a force on the attached mirror along the positive z-direction. Similarly, when pistons 314a and 314b are both moved in a negative z-direction, a force is generated on the attached mirror along the negative z-direction.

Moving piston 314a in a positive z-direction while moving piston 314b in a negative x-direction generates a moment or torque at the attaching face 308f about the x-axis. Similarly, moving piston 314a in a negative z-direction while moving piston 314b in a positive z-direction generates an opposite moment at the attaching face 308f about the x-axis. In various embodiments, the axis of rotation, pivot or fulcrum of these moments or torques is located substantially at the attaching face 308f.

Figure 4:
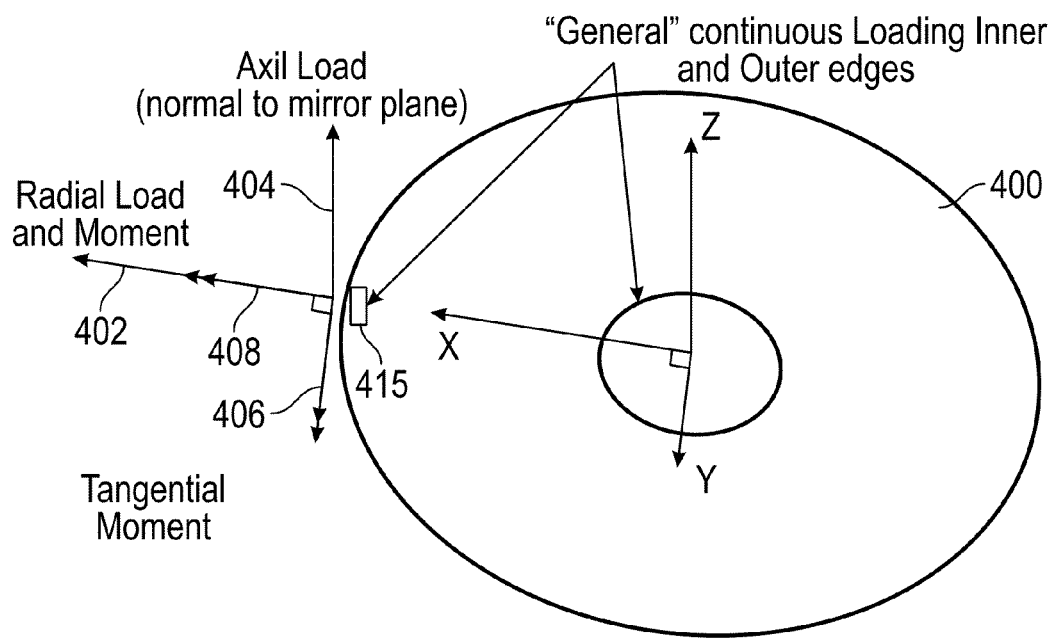
FIG. 4 shows an exemplary set of forces and moments that may be applied to a mirror using an exemplary actuator assembly of FIG. 3.

FIG. 4 shows an exemplary set of forces and moments that may be applied to a mirror 400 using an exemplary actuator assembly 300. For illustrative purposes only, the exemplary mirror 400 has a circular contour. The exemplary actuator may be coupled to the mirror at an edge location contact point 415. A radial force 402 (along the x-axis) may be applied by the operating actuators 304a and 304b in the same direction. Similarly, an axial force 404 (normal to the plane of the mirror) may be applied by the operating actuators 310a and 310b respectively, in the same direction. Moving the actuators 304a and 304b in opposite directions may provide a tangential moment 406 (about the y-axis). Moving the actuators 310a and 310b in opposite direction may provide a radial moment 408 (about the x-axis). The axis, fulcrum or pivot of the tangential moment and the radial moment may be located at the contact point 415 between the actuator assembly 300 and the mirror 400.

Figure 5:
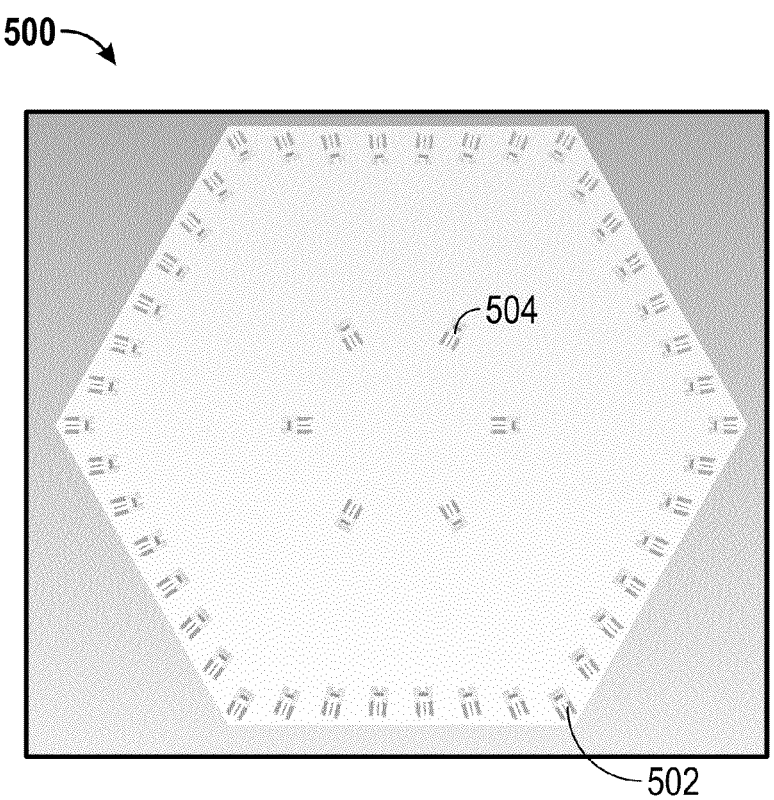
FIG. 5 shows an alternative spherical mirror having a hexagonal contour.
Figure 6:
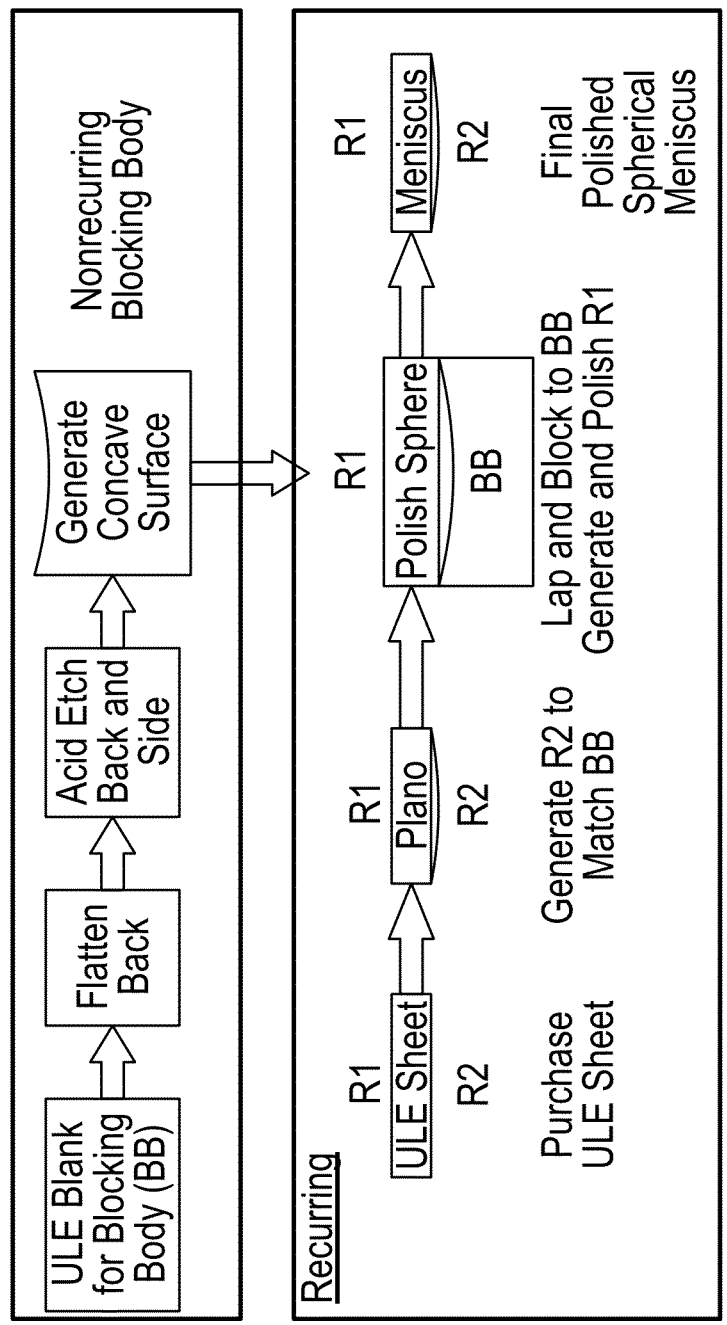
FIG. 6 shows a method of fabricating spherical meniscus segments.

FIG. 5 shows an alternative spherical mirror 500 having a hexagonal contour or outline. Use of a hexagonal outline facilitates the assembly of a plurality of mirror segments to form the segmented mirror 100 of FIG. 1. The alternative spherical mirror 500 includes a selected number of actuators 501 along the outer edge of the mirror 500. Another set of actuators 504 is disposed at an inner location of the mirror. In an exemplary embodiment, 42 actuators are disposed along the outer edge and six actuators are disposed along the inner edge. The actuators 501 and 504 may be activated by a control unit similar to control unit 215 of FIG. 2 to deform the spherical reflective surface into an aspheric surface that may include a surface of an off-axis segment of a paraboloid mirror. The control unit may activate the actuators 502 and 504 based on the equations described herein for applying a load to the edge or the mirror.

Analytical Basis for Approach

Consider a circular shallow spherical meniscus with a central hole under "general" continuous edge loading along the inner and outer edges (see FIG. 4). Other geometries more suitable to a segmented mirror may also be considered. The circular substrate geometry is considered here since it can be described using existing analytical results from shell theory. The use of such an analytical model provides significant insight, particularly with regard to the impact of the variety of geometric parameters and the limits of correctability with edge only loading. For this example we chose an off-axis segment of a paraboloid whose center is offset from the parent paraboloid axis.

A mathematical description of a deviation between a spherical surface and an aspheric surface is described below. In various embodiments, the aspheric surface is an off-axis segment of a surface of a paraboloid. A paraboloid of revolution about a z-axis in an (X,Y,Z) coordinate system is given by $$Z = \frac{X^2 + Y^2}{2k} \qquad \text{Eq. (1)}$$

where k is the radius of curvature at the vertex. For a local coordinate system (x,y,z) for which the origin is located at a distance R from the Z-axis, with the x-y plane inclined such that it is tangent to the paraboloid defined above, the coordinate system (X,Y,Z) is related to the coordinate system (x,y,z) by the following equations:

$$X = R + \cos\alpha \cdot x - \sin\alpha \cdot z \qquad \text{Eqs. (2)}$$
$$Y = y$$
$$Z = \left(\frac{R^2}{2k}\right) + \cos\alpha \cdot z - \sin\alpha \cdot x$$

where $$\alpha = \tan^{-1}\frac{R}{k}$$

is the angle at which the x-y plane is inclined. The Eq. (1) of the paraboloid may then be rewritten in the local (x,y,z) coordinate system as:

$$\left(\frac{R^2}{2k}\right) + \cos\alpha \cdot z - \sin\alpha \cdot x = \frac{(R + \cos\alpha \cdot x - \sin\alpha \cdot z)^2 + y^2}{2k} \qquad \text{Eq. (3)}$$

Solving equation Eq. (3) for z gives:

$$z(x, y) = \frac{k \cdot x}{R} - \frac{\sqrt{2} \cdot (R^2 + k^2)}{2R^2} \cdot \qquad \text{Eq. (4)}$$
$$\sqrt{2 \cdot (R^2 + k^2) + \frac{4Rk}{\sqrt{R^2 + k^2}} \cdot x - \left(\frac{2R^2}{R^2 + k^2}\right) \cdot y^2} +$$
$$\frac{(R^2 + k^2)^{3/2}}{R^2}$$

The departure of the paraboloid surface of Eq. (4) from a surface of a sphere of radius ρ can be therefore written as:

$$\delta(r, \theta, \rho) = \frac{k \cdot r \cdot \cos\theta}{R} - \frac{\sqrt{2} \cdot (R^2 + k^2)}{2R^2} \cdot \qquad \text{Eq. (5)}$$
$$\sqrt{2 \cdot (R^2 + k^2) + \frac{4Rkr\sin\theta}{\sqrt{R^2 + k^2}} - \left(\frac{2(Rr\sin\theta)^2}{R^2 + k^2}\right)} +$$
$$\frac{(R^2 + k^2)^{3/2}}{R^2} + \sqrt{\rho^2 + r^2} - \rho$$

where the substitutions x=r·cos θ and y=r·sin θ have been made to convert to polar coordinates.

In an exemplary embodiment, the methods disclosed herein apply loads at an edge, i.e., the circumference, of a spherical reflective surface to deform the spherical surface to an aspheric surface such as a surface of an off-axis segment of the paraboloid described by the above equations. In order to induce this deformation, loads are applied to the mirror at its edge. From shell theory, the displacement of a shallow spherical shell with force and moment loads applied at its edges can be represented by:

$$w(x, \theta) = \qquad \text{Eq. (6)}$$
$$\sum_{m=0}^{\infty} \begin{bmatrix} (\alpha_{0,m} \cdot x^m + \alpha_{1,m} \cdot x^{-m} + \alpha_{2,m} \cdot ber(m, x) + \alpha_{3,m} \cdot bei(m, x) + \\ \alpha_{4,m} \cdot ker(m, x) + \alpha_{5,m} \cdot kei(m, x)) \cdot \cos(m \cdot \theta) \ldots + \\ (\beta_{0,m} \cdot x^m + \beta_{1,m} \cdot x^{-m} + \beta_{2,m} \cdot ber(m, x) + \\ \beta_{3,m} \cdot bei(m, x) + \beta_{4,m} \cdot ker(m, x) + \\ \beta_{5,m} \cdot kei(m, x)) \cdot \sin(m \cdot \theta) \end{bmatrix}$$

The α and β are constants that depend on the loading. The functions ber, bei, ker, and kei are kelvin functions which can be defined in terms of Bessel functions:

$$ker(m, x) = \text{Re}\left[e^{-\frac{m\pi}{2} \cdot i} \cdot K_n\left(m, x \cdot e^{\frac{\pi}{4} \cdot i}\right)\right] \qquad \text{Eq. (7)}$$

$$ber(m, x) = \text{Re}\left[J_n\left(m, x \cdot e^{-\frac{3\pi}{4} \cdot i}\right)\right] \qquad \text{Eq. (8)}$$

$$kei(m, x) = \text{Im}\left[e^{-\frac{m\pi}{2} \cdot i} \cdot K_n\left(m, x \cdot e^{\frac{\pi}{4} \cdot i}\right)\right] \qquad \text{Eq. (9)}$$

-continued $$bei(m, x) = \text{Im}[J_n(m, x \cdot e^{-\frac{3\pi}{4}i})] \qquad \text{Eq. (10)}$$

in which $K_n$ is a modified Bessel function of the second kind and $J_n$ is a Bessel function of the first kind. Thus, the deformation of the mirror and its resultant shape under applied loads may be described by the functional form of Eq. 6. An example described in the following paragraphs demonstrates that the functional form of Eq. 6 can match the departure described by Eq. 5 within optically relevant tolerances.

For this example we chose an off-axis segment of a paraboloid (vertex radius 16.3 m) whose center is offset 2.4 m from the axis. The segment diameter is 1.5 m, and the substrate thickness is 5 mm. The substrate material considered is Ultra Low Expansion (ULE) glass.

The prescription's departure from the initial spherical shape is 390 μm peak-to-valley, and is largely composed of astigmatism. The predicted residual surface error by the analytical model is 5.1 nm RMS after correction from the sphere to the off-axis section of a paraboloid.

Figure 7:
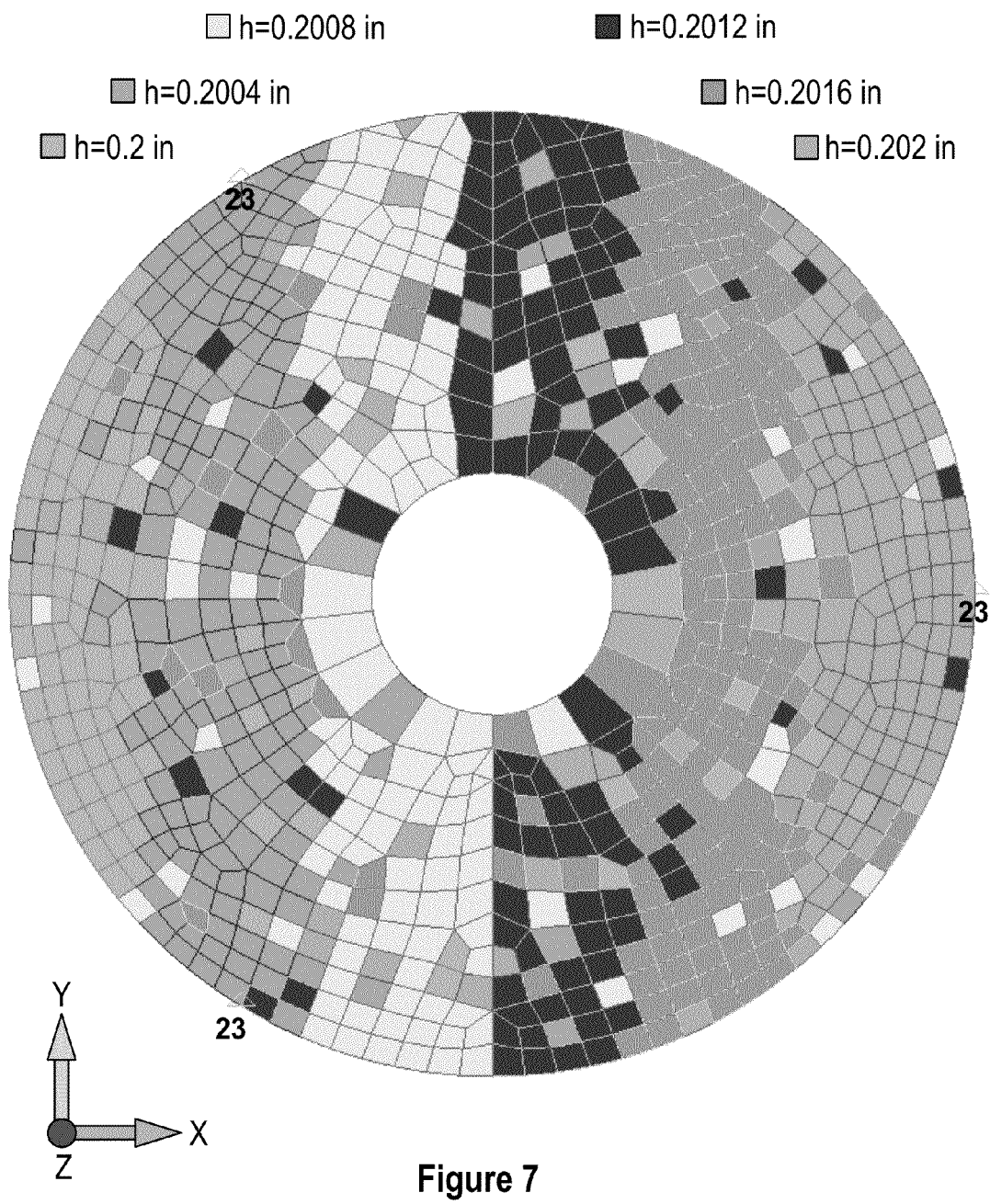
FIG. 7 shows thickness errors of a finite element model of the mirror.
Figure 8:
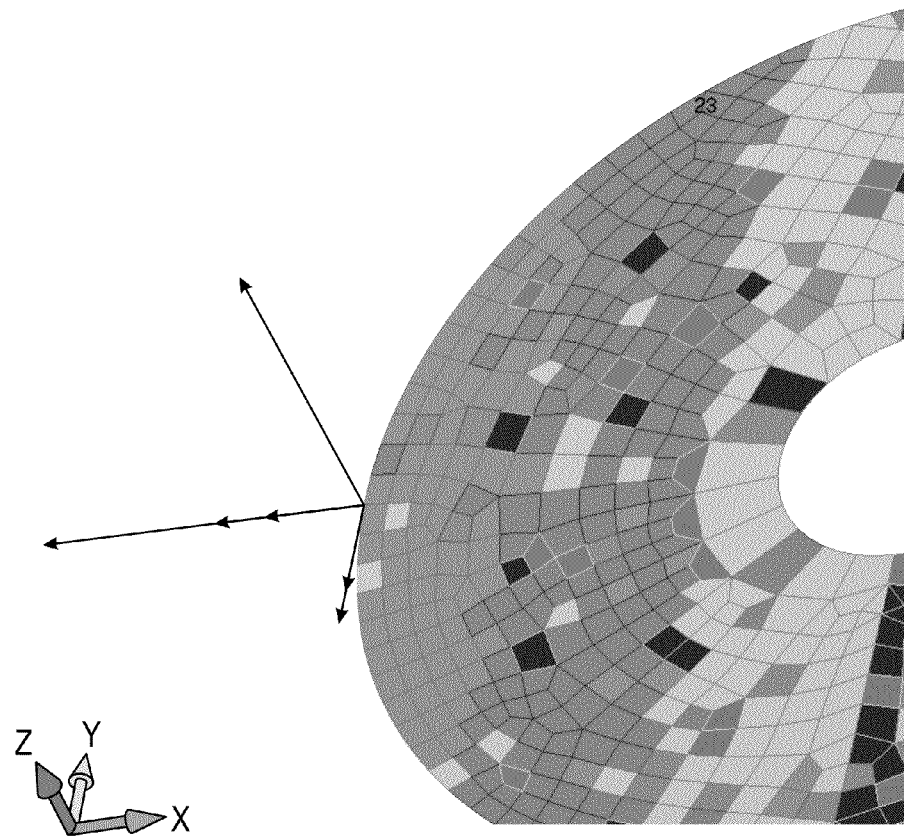
FIG. 8 shows discrete loading of the finite element model.

A Finite Element Model (FEM) was created with the same geometry to see if the low residual error was an mathematical artifact of, e.g., continuous edge loading or perfect meniscus thickness, which is not possible in practice. The FEM includes both thickness errors and discrete loading as shown in FIG. 7 and FIG. 8.

Figure 9:
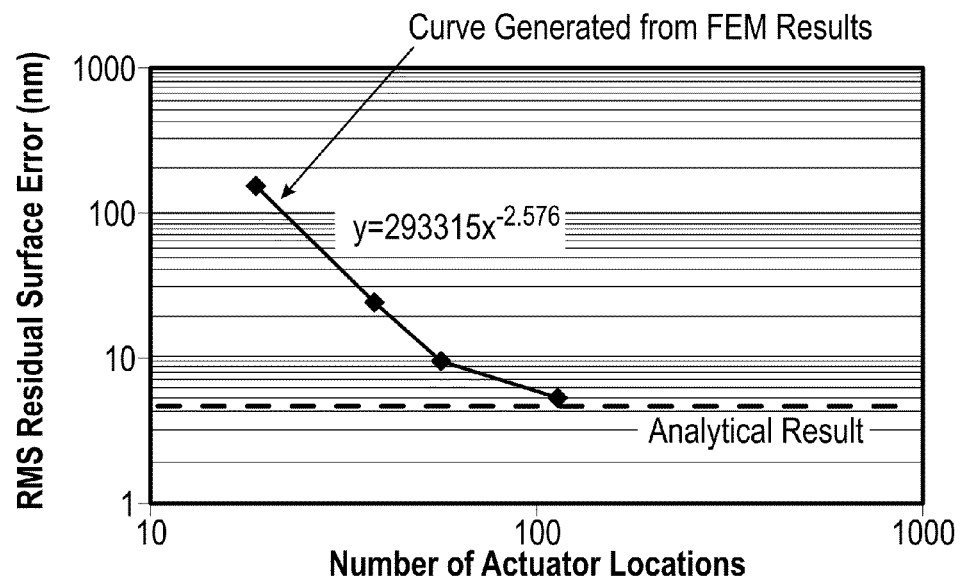
FIG. 9 shows the residual error predicted by the FEM for a varying number of equally spaced actuator locations on the edges of the mirror.

FIG. 9 shows the residual error predicted by the FEM for a varying number of equally spaced actuator locations on the edges (both inner and outer). As shown in the figure, the residual error approaches the analytical result as the number of actuator locations is increased. The residual error remains low with relatively few actuator locations.

Deformable Mirror Concept

A segmented mirror application is used as an example to describe an approach according to one embodiment. Consider a JWST-like segmented primary mirror consisting of 18 hexagonal mirror segments. There are three unique aspheres corresponding to different zones as shown in FIG. 1. For each zone, a spherical meniscus mirror with the zone specific radius can be deformed to the off-axis asphere with a surface accuracy of ~10 nm RMS residual error.

FIG. 5 shows a mirror concept suitable for a segmented mirror. For this example, a 1.4 m (point-to-point) 5 mm thick ULE glass hexagonal mirror concept was developed. Actuators shown in FIG. 3 mounted at 48 locations on the mirror substrate provide control of four degrees-of freedom at each location. Note that other segment configurations are possible, such as a trapezoidal segment shape that would avoid the need for an inner ring of actuators. Each actuator set controls radial and axial (normal to plane of mirror) forces, and radial and tangential moments. The base of the actuator sets are mounted to a support structure (not shown). No intermediate reaction structure is required since the configuration allows piston, tip and tilt control relative to the support structure. The base of the actuator sets can be directly mounted to the support structure common to all segments (or a subset of segments for a deployable "petal" design). The large spacing between actuators is ideally suited to an efficient truss support structure. The same prescription described previously is considered, which results in a 275 μm peak-to-valley departure from the initial spherical meniscus. Based on the chart in FIG. 9, a residual error of ~13.5 nm was expected for this design (as described later, a slightly lower than expected residual error of 11.9 nm was actually achieved).

Actuator Set Design

Figure 10:
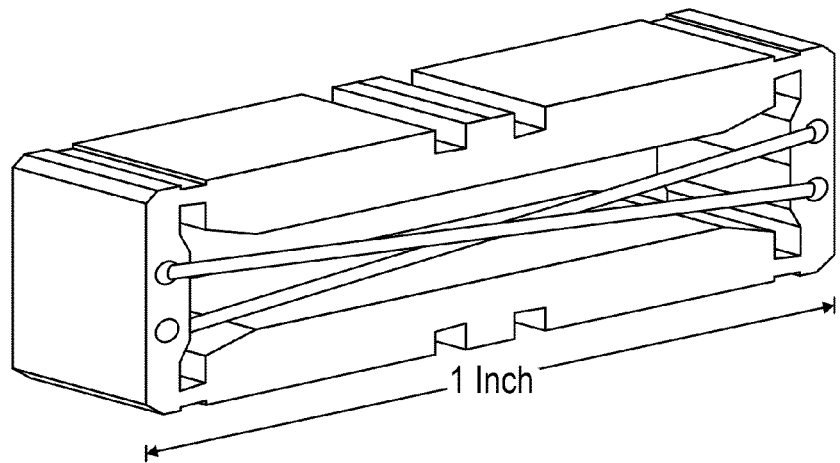
FIGS. 10 and 11 shows piezoelectric based lever amplified actuators.

The actuator set concept is shown in FIG. 3. As shown in FIG. 5, the axis of the radial wire flexures is aligned toward the center of the mirror. Each actuator set provides control over four degrees of freedom: 1. A radial force is generated when the radial actuators are activated in unison; 2. A tangential moment is generated when the radial actuators are activated in opposite directions; 3. An axial force is generated when the axial actuators are activated in unison; and 4. A radial moment is generated when the axial actuators are activated in opposite directions. The ability to control four degrees of freedom at a single interface to the mirror enables high correctability with substantially fewer interfaces to the mirror compared to single degree of freedom actuation approaches (e.g., piston or moment actuators). An actuator set contains four piezoelectric based lever amplified actuators (see FIG. 10 and FIG. 11). Each actuator provides displacement along the axis of the wire flexures. The concept shown is based on commercially available actuators (see example in FIG. 10) from Dynamic Structures and Materials (DSM), LLC. Similar high resolution piezoelectric based actuators with strokes over a millimeter are available.

Figure 11:
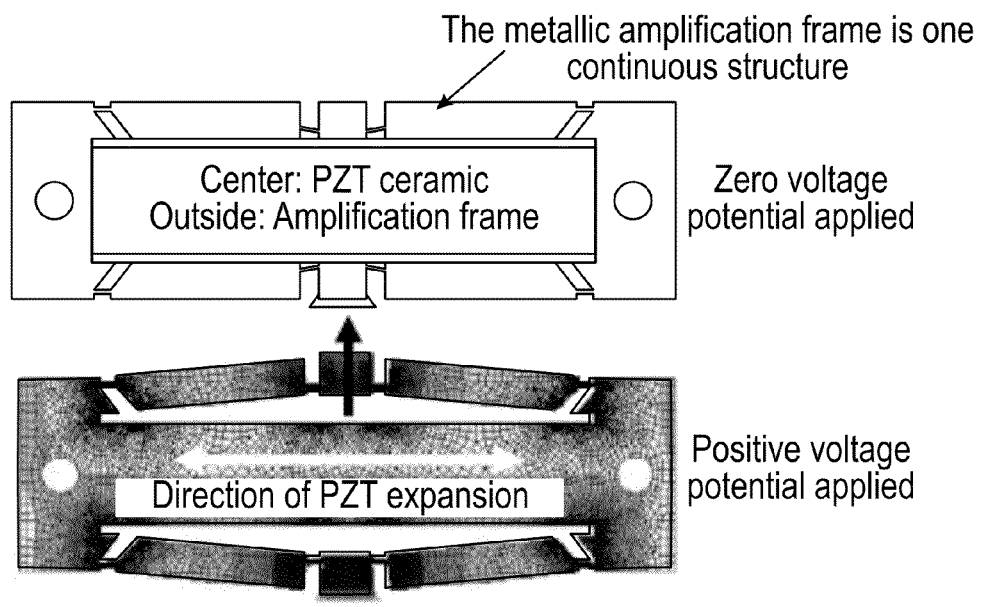

As shown in FIG. 11, each actuator consists of a metallic amplification frame that surrounds the piezoelectric element. The amplification frame has offset flexural hinges that provide lever amplification of the displacement from the piezoelectric element. An important aspect of the actuator set design is the ability to control parasitic forces/moments (in the relevant directions) that result from the bending of the wire flexures. For example, if the radial wire flexures are activated in unison, a radial force is generated (as desired) as well as a parasitic tangential moment from the bending of the axial wire flexures. However, the actuator set has the ability to control tangential moments and hence can self-compensate for this parasitic loading. Similar arguments can be used for compensation of parasitic loads which occur during control of other degrees of freedom. The ability for self-compensation enables high stroke from the actuator while maintaining a high degree of figure control. This ability eliminates the need for an intermediate reaction structure and a separate actuation system to control intersegment alignments.

Mass Estimate

The mass estimate of the 1.4 m concept shown in FIG. 5 is 44.8 lbs (20.3 kg): 31 lb. (11 kg/m2) for the ULE Substrate (5 mm thick); 7.6 lb. (2.7 kg/m2) for the Actuators; 4.8 lb. (1.7 kg/m2) for the Actuator Mounting Brackets; 0.79 lb. (0.28 kg/m2) for the Wire Harness; and 0.6 lb. (0.21 kg/m2) for the Wire Flexures and Wire Flexure Adapters The corresponding areal density is 15.9 kg/m2. We believe the mass estimate is conservative as the tradespace (diameter, thickness, actuator distribution, etc.) has not been explored. Hence, it is likely that more mass efficient designs exist. Specifically, the choice of a 5 mm thick substrate is arbitrary. A thinner substrate may lower mass and substrates as thin as 2 mm have been fabricated. The use of other substrate materials (e.g. SiC) may also contribute to reduction of mass. Also, the mass of the actuators is based on existing off-the-shelf designs for which mass was not a concern. Adjusting actuator spacing to suit a selected prescription results in fewer actuators for an equivalent residual error. There is also a potential to reduce actuator dynamic range by building astigmatism into the meniscus. The actuator bracket design has not been optimized for mass.

Design Concept Analysis

This section provides an overview of analysis results for the above described design concept. The residual error for the design is described, in addition to the sensitivity of the residual error to, e.g., manufacturing errors and actuator failure. Preliminary stress and modal analysis is also summarized.

Figure 12:
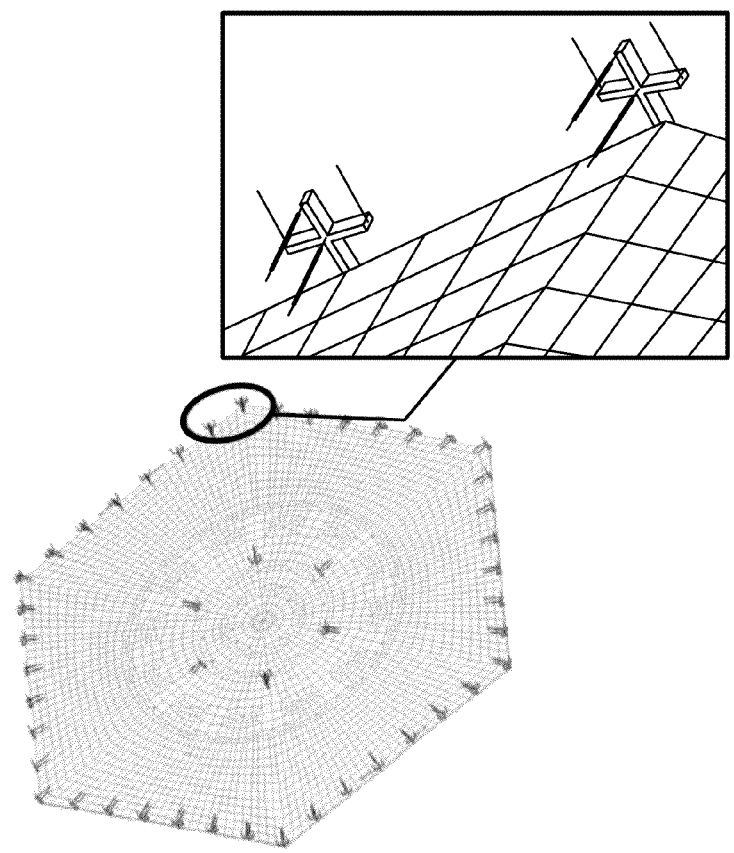
FIG. 12 shows a finite element model of a mirror.

The FEM shown in FIG. 12 consists of 5101 nodes, 3372 plate elements (for the substrate) and 1668 beam elements (largely for the actuator wire flexures).

Figure 13:
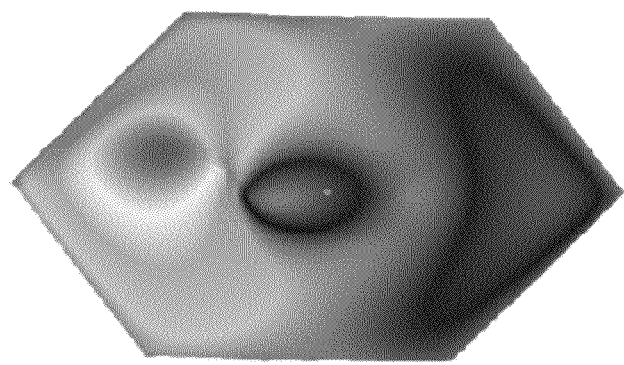
FIG. 13 shows an exemplary influence function generated with the finite element model of FIG. 12.

An example influence function generated with the FEM is shown in FIG. 13. The influence functions are here defined as the R1 surface displacement corresponding to a unit displacement of a single actuator (i.e. just one piezoelectric element is activated and all others remain in their "rest" state). Hence, each actuator has an associated influence function (each actuator set has four associated influence functions). The influence functions have significant displacement across the entire R1 surface; this "non local" smooth behavior results since most of the actuators are outside of the optical surface (e.g. on the edges) minimizing high frequency residual errors typical of interior point control approaches.

Figure 14:
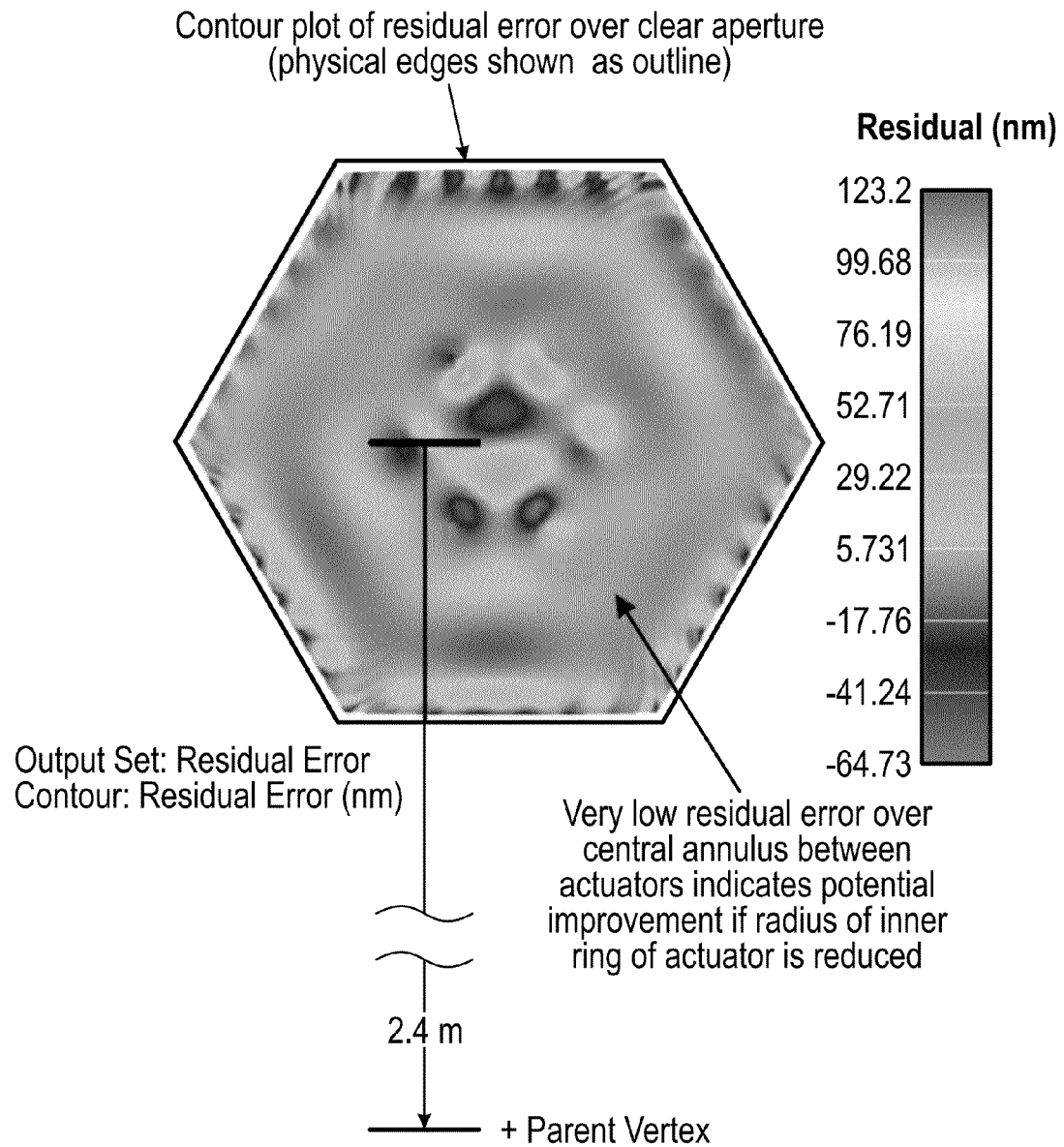
FIG. 14 shows a contour plot of an residual surface error calculated after deforming the spherical meniscus to achieve an off-axis section of a paraboloid.

FIG. 14 shows a contour plot of the 11.9 nm RMS residual surface error calculated after deforming the spherical meniscus by 275 microns peak-to-valley to achieve the off-axis section of a paraboloid. The clear aperture over which the residual error is calculated is ~20 mm (~0.75 in.) inboard of the physical edge of the mirror. The residual error is dominated by edge effects, particularly along the +X edge of the mirror (note red spots along +X edge in FIG. 14). These results indicate potential to reduce residual error (to less than 10 nm) and actuator count (and hence lower mass) by decreasing actuator spacing on the +X edge and increasing actuator spacing on the other edges.

Decreasing the clear aperture to 1.6 in. inboard of the outer edge and masking the inner actuators the residual error is only 5 nm. This behavior is a result of the very low error over the central annulus between the actuators. Hence, it may be possible to lower the residual error further by changing the inner actuator ring diameter, or using a different geometry (such as a trapezoid substrate) that eliminates the interior actuators. The largely unexplored trade-space may contain lower mass higher performance designs.

Figure 15:
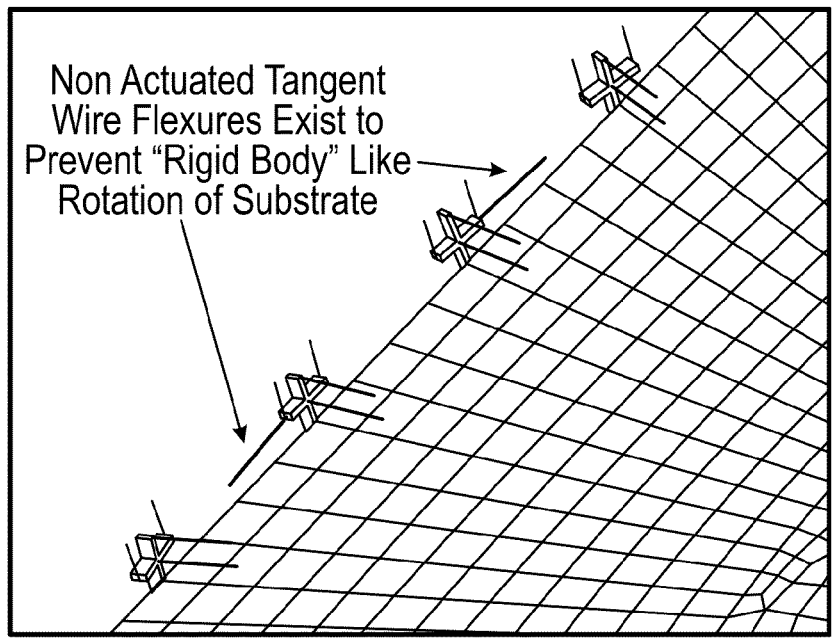
FIG. 15 shows four non-actuated tangent flexures that constrain rotation of a substrate.

The slight asymmetry of the residual error in FIG. 14 is the result of a total of four non-actuated tangent flexures that constrain rotation of the substrate (see FIG. 15). These tangent flexures are located on two edges of the substrate (at 8 o'clock and 2 o'clock edges in FIG. 14) and create a slight asymmetry in the residual error.

Actuator Stroke

Figure 16:
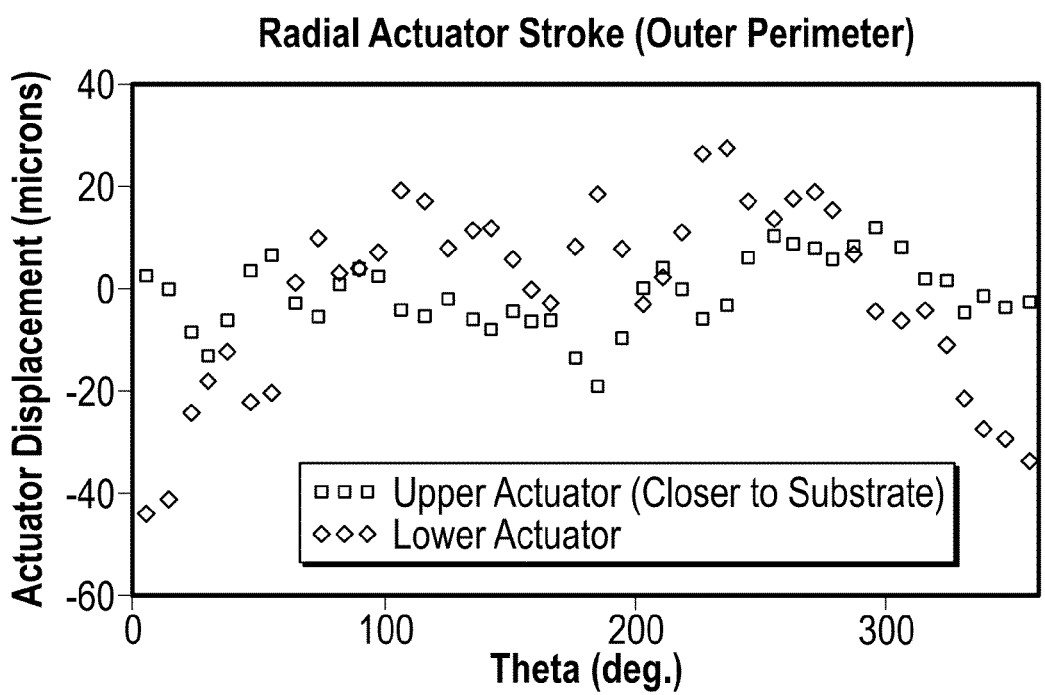
FIG. 16 shows radial actuator stroke applied at an outer perimeter of the mirror.
Figure 17:
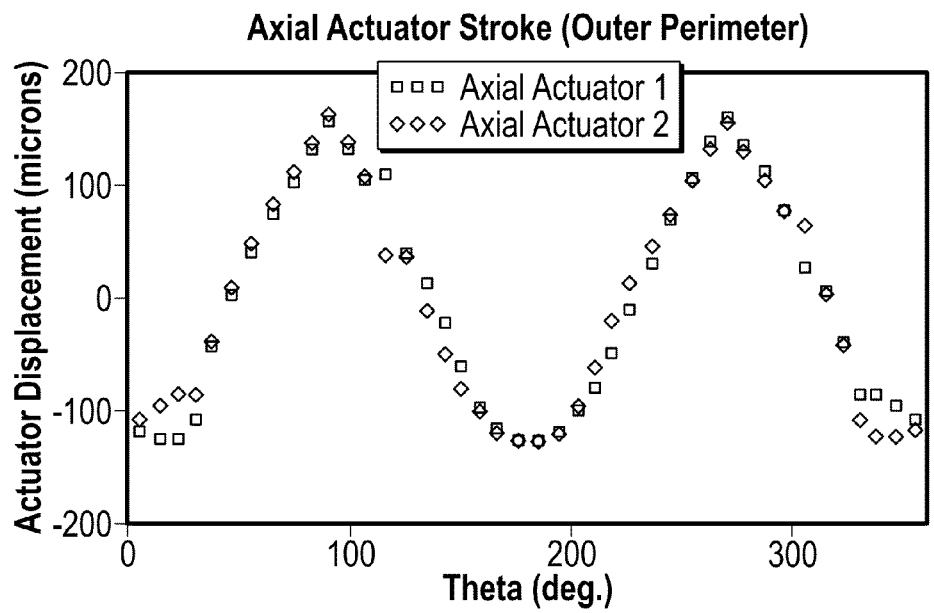
FIG. 17 shows an axial actuator stoke applied at an outer perimeter of the mirror.

As shown in FIG. 16 and FIG. 17, the maximum predicted radial actuator stroke is ~40 µm (with the majority below 20 µm), and the maximum axial actuator stroke is 163 µm. The maximum axial actuator stroke is slightly larger than would be expected from consideration of the peak-to-valley departure alone due to the compliance of, e.g., the axial wire flexures. These levels of stroke are well within the capability of commercially-available lever amplified piezoelectric based actuator designs.

Correctability in Presence of Piston and Tilts

To characterize the impact of tilt on figure correction the residual error was calculated by superimposing various amounts of tilt onto the target figure. This is equivalent to commanding a rigid body tilt of the mirror (to compensate for, e.g., support structure instability) and then correcting the figure about the tilted plane. For this analysis the axial actuator stroke was arbitrarily limited to 800 µm (higher actuator strokes are possible if required). The residual error was calculated using a constrained least squares algorithm to enforce the actuator stroke limitation.

Figure 18:
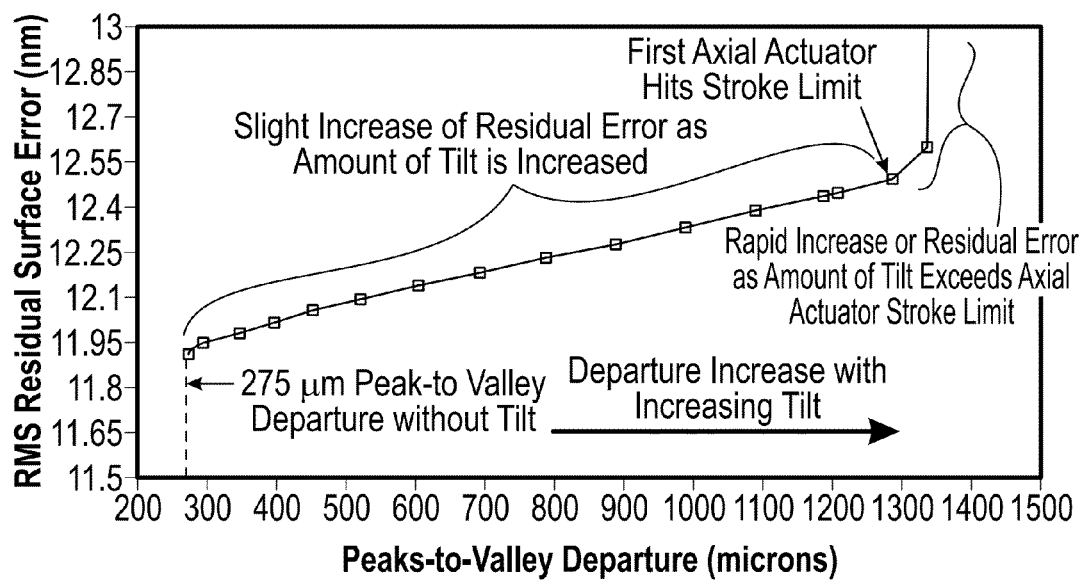
FIG. 18 shows an amount residual error increases with an increasing amount of tilt of the mirror.

FIG. 18 shows how the residual error increases with an increasing amount of tilt. The x-axis of the plot shows the peak-to-valley departure from the target shape (which is the target figure with a superimposed tilt), which increases as the amount of tilt error is increased. The y-axis is the RMS residual surface error.

The residual error increases less than 1 nm over the full stroke of the actuators. This is a result of the actuator sets' ability to compensate for parasitic forces and moments that arise from bending of, e.g., the wire flexures. When the actuator stroke limit is reached the residual error rapidly increases as expected.

Similar behavior is observed for piston errors. That is, the residual error is a weak function of piston displacement of the mirror until the stroke limit of the actuators is reached.

Correctability of Zernikes

Figure 19:
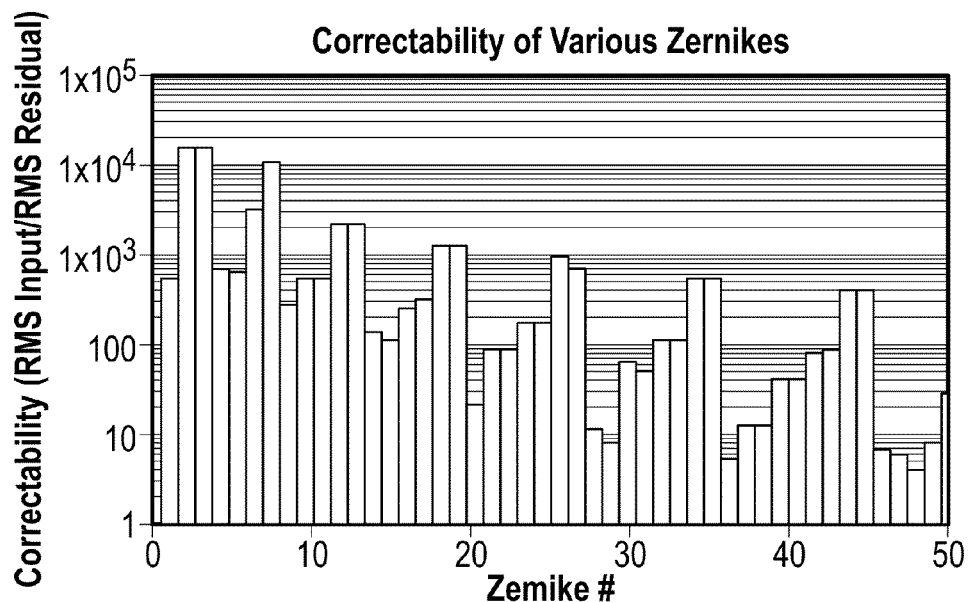
FIG. 19 shows a correctability of various Zernikes of the mirror system.

It is often convenient to express wavefront data from, eg., optical test results, in polynomial form. Zernike polynomials are often used for this. Zernike polynomials form a complete set of functions that are orthogonal over a circle of unit radius and are convenient for serving as a set of basis functions for describing optical aberrations. FIG. 19 shows the correctability of various Zernikes, where correctability is defined as the RMS of the input shape (in this case, a Zernike) divided by the RMS residual surface error attributed to deforming the mirror to this shape. Note that the first bar in the plot corresponds to Zernike #4, which is focus.

Astigmatism (Zernike #5 and 6) is the most correctable. This is desired since the departure of an off-axis section of a paraboloid from the best fit sphere is dominated by astigmatism. If the target prescription were dominated by another shape, the actuator distribution would be optimized accordingly. The high level of correctability for some of the higher order Zernikes is surprising considering the large spacing between actuators. This suggests that midspatial frequency errors can be corrected to some degree, relaxing fabrication requirements.

Low Sensitivity to Substrate Thickness Errors

Figure 20:
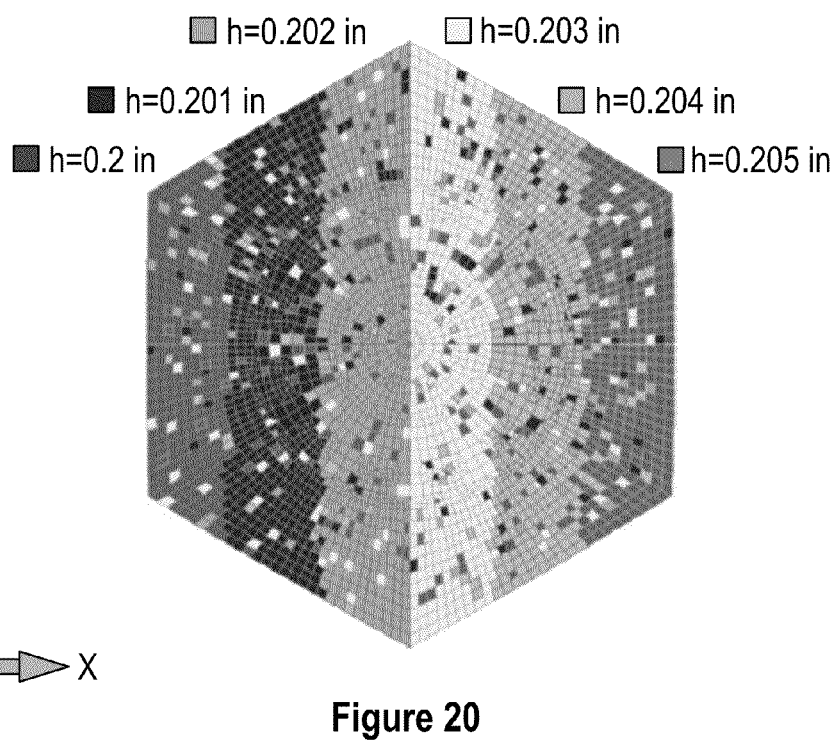
FIG. 20 shows a finite element model used for an assessment of the sensitivity of the mirror system to substrate thickness errors.

To assess sensitivity to substrate thickness errors, both a wedge and random thickness error was imparted to the substrate. A wedge error is considered since some amount of wedge is expected as a result of the optical fabrication process. FIG. 20 shows a finite element model used for an assessment of the sensitivity of the mirror system to substrate thickness errors. As shown in FIG. 20, up to 5 mils of error was considered which is conservative relative to expected thickness tolerances. The residual error with the described thickness errors is only 12 nm, which is very close to the 11.9 nm without thickness errors. These results indicate that performance is not sensitive to thickness errors, thereby relaxing fabrication requirements.

Low Sensitivity to Radius Errors

Figure 21:
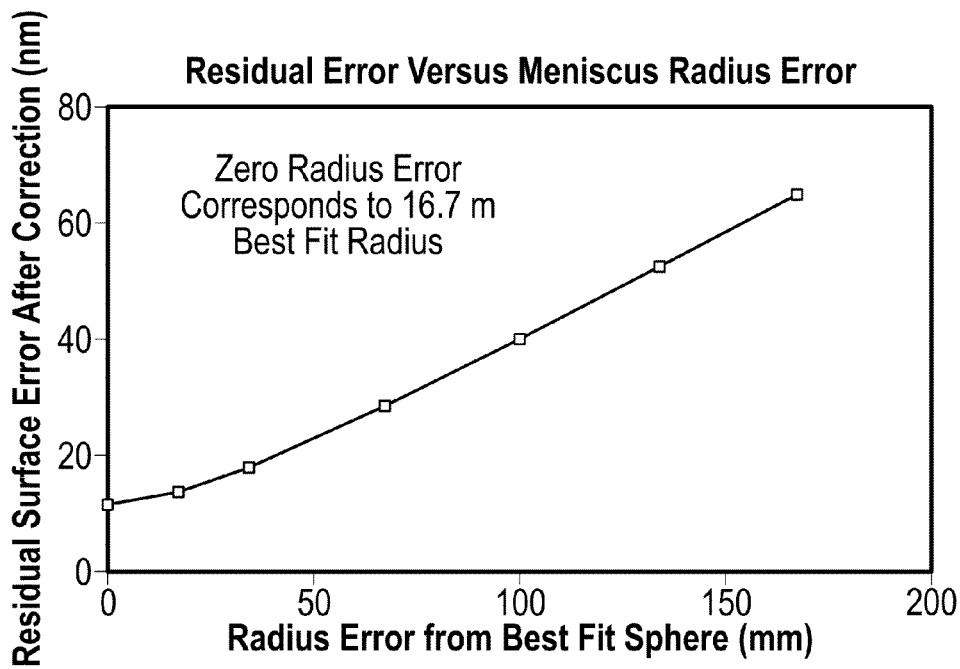
FIG. 21 shows a residual error after correction with a varying amount of radius error due to various effects due to uncertainty in coating residual stress.

FIG. 21 shows the residual error after correction with a varying amount of radius error due to such effects as fabrication tolerances, segment placement tolerances, coating residual stress, and thermal gradients. The residual error increases with increasing radius error due to the greater departure from the off-axis prescription (the initial shape is no longer the best fit sphere to the target aspheric shape). The radius error due to a through-the-thickness (axial) temperature gradient for ULE is approximately 1.64 mm for a through thickness $\Delta T=1°$ C. (actual axial gradient is estimated to be well below 1° C. since the substrate is only 5 mm thick). As shown, the residual error is not sensitive to radius errors of this magnitude. Residual error remains low even with tens of millimeters of radius error relaxing fabrication, coating residual stress, integration and thermal control requirements.

With regard to the impact of coating residual stress uncertainty, the expected radius error is only ~6 mm with standard coating processes. This is substantially higher than what is observed for typical mirrors since the substrate is only 5 mm thick. However, the impact of this magnitude of radius error is small as shown in FIG. 21. For a low residual stress coating process the radius error is only ~2 mm for a 5 mm thick substrate.

Low Sensitivity to Actuator Displacement Errors

Figure 22:
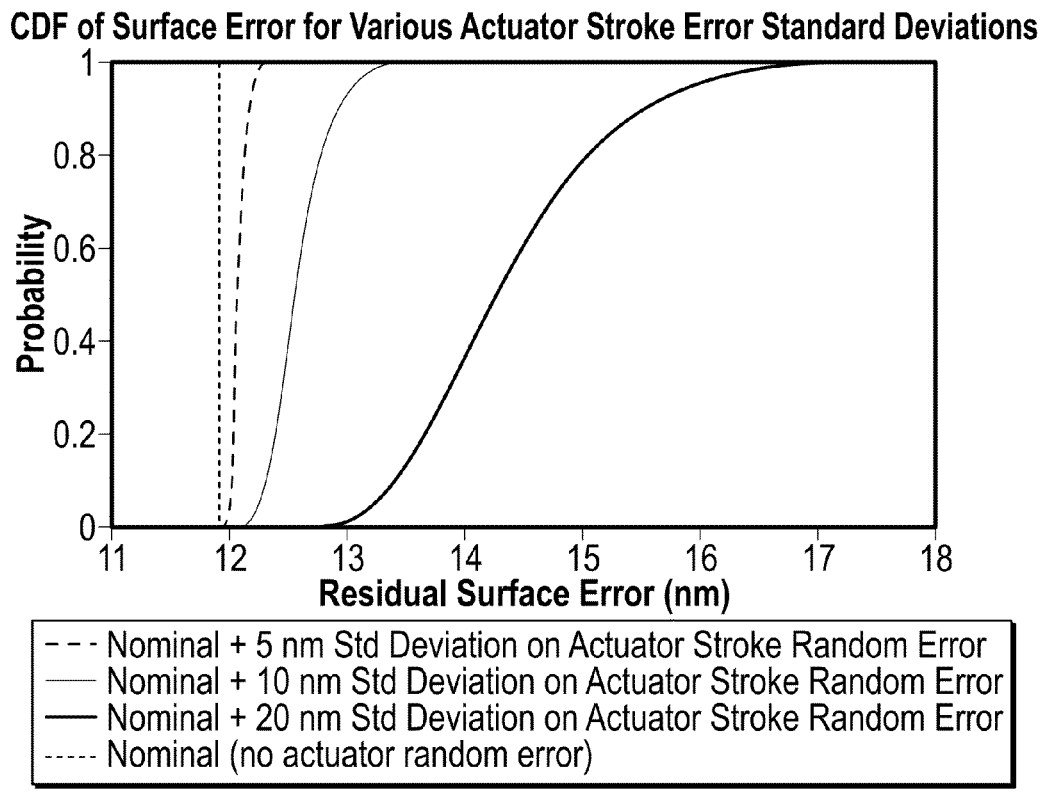
FIG. 22 shows a Cumulative Distribution Functions (CDF) of the RMS residual surface error for various actuator stroke error standard deviations.

A key requirement of the actuator sets is to provide relatively large stroke and maintain high resolution. The large stroke enables intersegment alignment and the high resolution allows for figure control. FIG. 22 shows the Cumulative Distribution Functions (CDF) of the RMS residual surface error for various actuator stroke error standard deviations. Note that even with a 10 nm standard deviation the residual error is below 13 nm with over 90% probability.

Actuators with 1 mm of stroke and significantly less than 10 nm RMS stroke error are commercially available. The residual error with the likely conservative 10 nm RMS stroke error results in only ~1 nm increase of residual surface error.

Low Sensitivity to Actuator Failure

Figure 23:
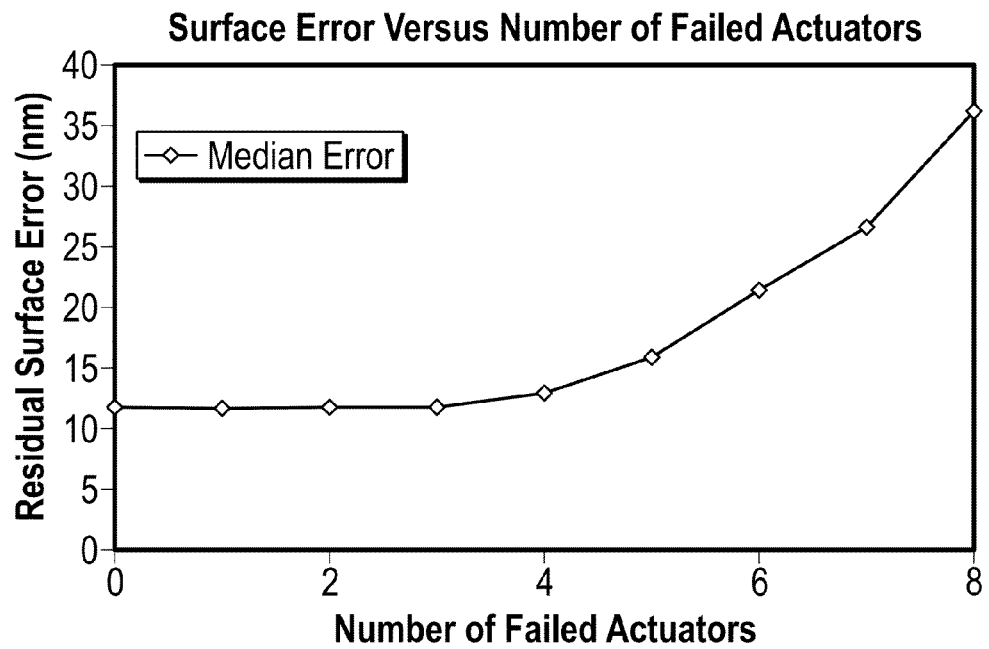
FIG. 23 shows a relation between surface error and a number of failed actuators.

Actuator failure was investigated by considering failed actuators to be "frozen" in place. Since results differ depending on which actuators fail, a Monte Carlo analysis was used to determine the median residual error resulting from a given number of random actuator failures. As shown in FIG. 23, the residual error is likely acceptable, even with multiple actuator failures; with 4 actuator failures the median residual error is less than 15 nm. This is partly a result of some level of "redundancy" in the actuator set design. For example, if one of the axial actuators fails, the actuator set is still capable of producing an axial force, but it is now coupled with a radial moment.

Design is Testable in 1-G

Figure 24:
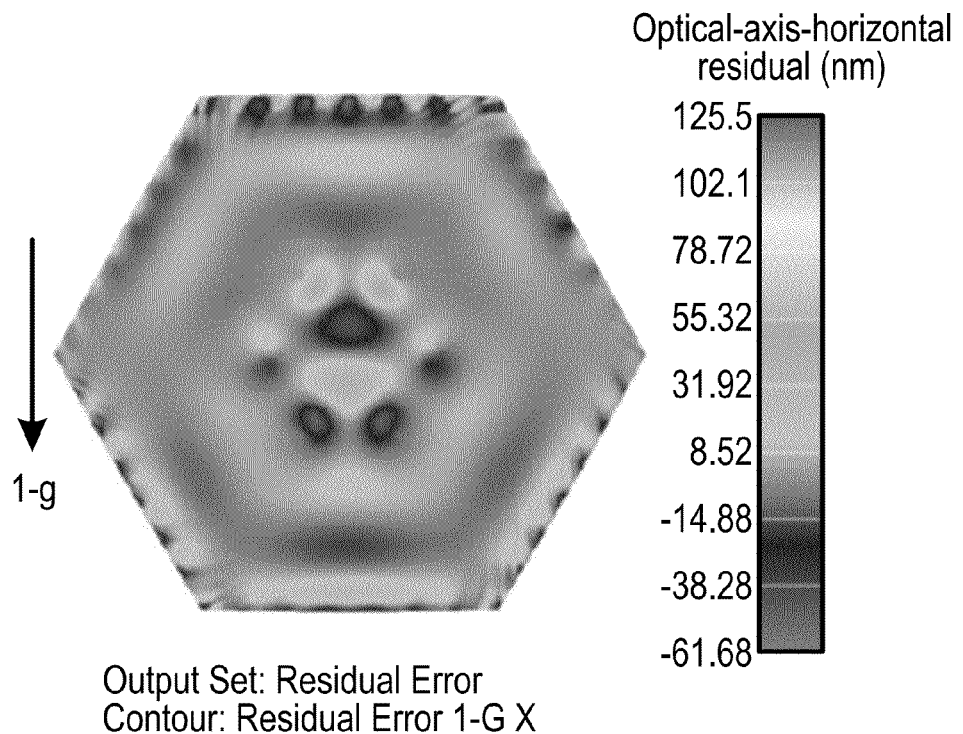
FIG. 24 shows a residual error after correction under 1-G in the optical-axis-horizontal orientation.

The residual error after correction under 1-G in the optical-axis-horizontal orientation is shown in FIG. 24. RMS residual surface error is only 12.2 nm, indicating that the design is testable without the need for an off-loading system. The residual error in the optical axis vertical orientation can also be corrected (with a predicted RMS residual surface error below 13 nm), but the actuator stoke for the radial actuators is a factor of ~2.5 greater than the max stroke shown in FIG. 16. This higher stroke is expected to generate the tangential moment/rotation required to correct for the significant sag under 1-G in this orientation. The maximum required actuator stroke for correction in the axis horizontal orientation is similar to that shown in FIG. 16 and FIG. 17.

Low Residual Error of Inner Segments

Figure 25:
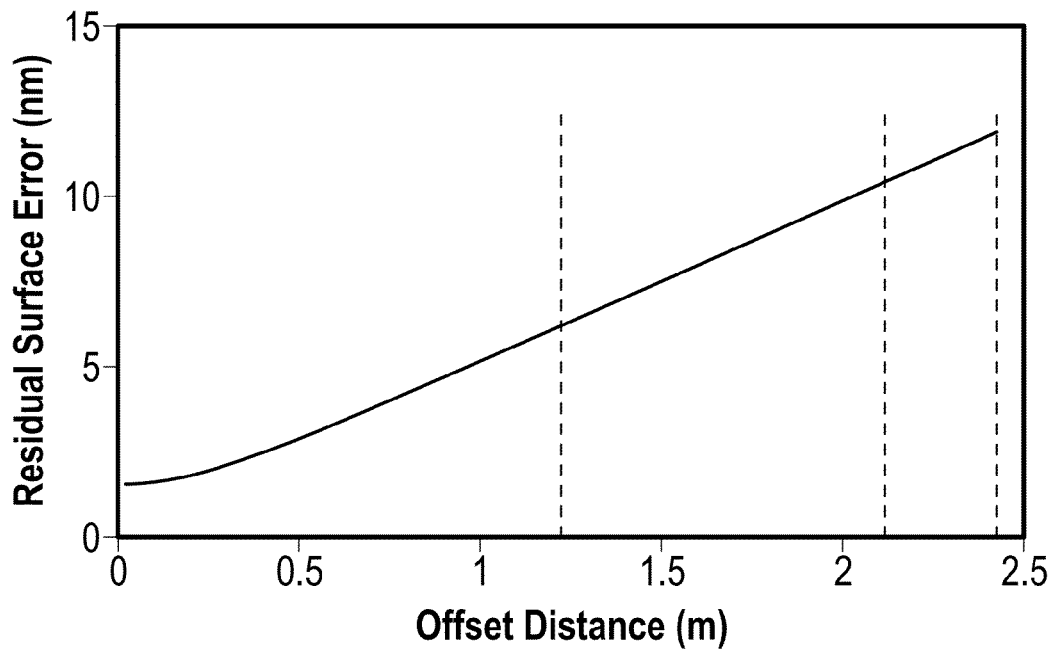
FIG. 25 shows a relation between residual surface error and offset distance.

The residual errors quoted previously correspond to correction to an off-axis section of a paraboloid with a vertex radius of curvature of 16.3 m and an off-axis distance of 2.43 m. This is the "worst case" offset corresponding to a ~6 m segmented mirror with 1.4 m segments. The smaller offset distances for the interior segments have a lower residual error as shown in FIG. 25. The dotted lines in the plot correspond to the three offset distances for the 6 m segmented mirror shown in FIG. 1. Because the inner segments have a lower residual error, the residual figure error over all segments is less than the 11.9 nm for the outer segments.

Modal Analysis

Figure 26:
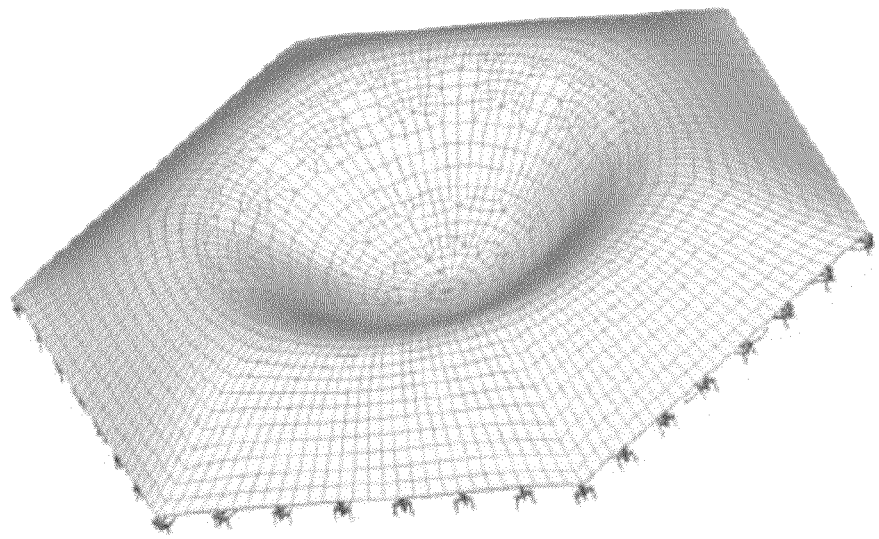
FIG. 26 shows the first mode shape and frequency of the mirror assembly.

The frequency of the first normal mode is 91 Hz. As shown in FIG. 26, the nodal lines of the first mode correspond to the actuator locations (outer perimeter and inner ring). The first mode frequency can be increased substantially by tailoring the distribution of actuators if required.

Figure 27:
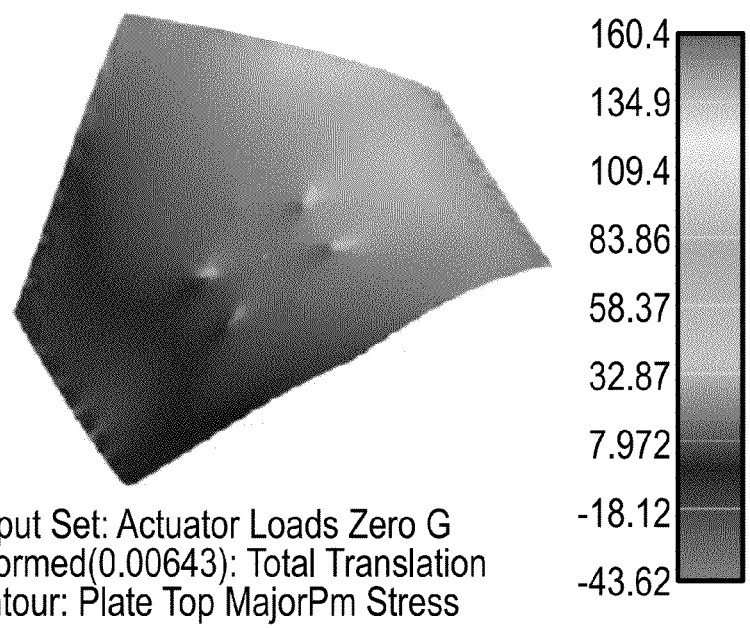
FIG. 27 shows a peak stress in a glass substrate after correction in 0-g at 160 psi.

The peak stress in the glass substrate after correction in 0-g is 160 psi as shown in FIG. 27 (allowable stress is nearly an order of magnitude greater). The peak stress is 343 psi after correction under 1-G Z (i.e. optical axis vertical), which is the worst case. Given the low stress in the substrate after correction, the actuators can likely be sized such that an erroneous large actuator command will not break the substrate. That is, the force capability of the actuator may be sized such that it cannot fracture the substrate, yet will still have sufficient force margin for correcting figure.

Stress Under G-Loads

Figure 28:
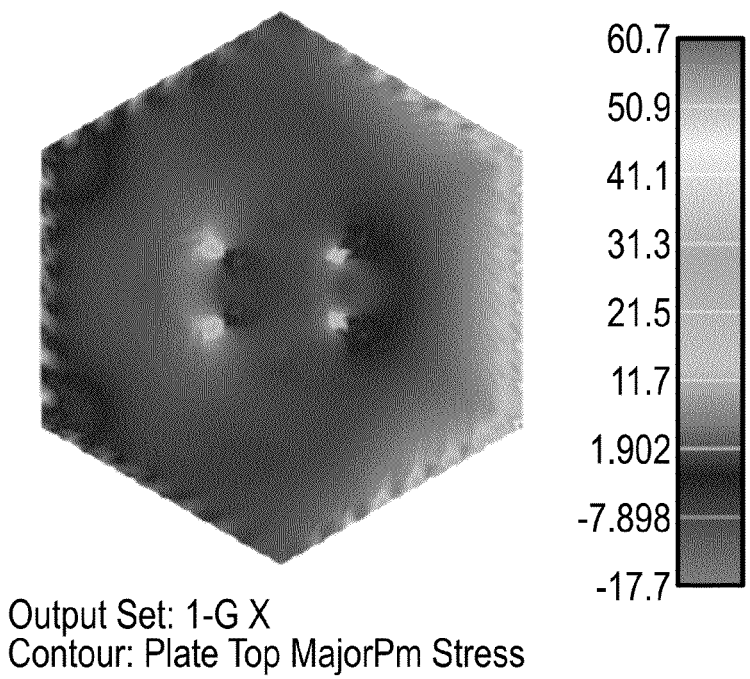
FIGS. 28-30 show stress contours of the mirror under X, Y, and Z direction 1-g accelerations, respectively.
Figure 29:
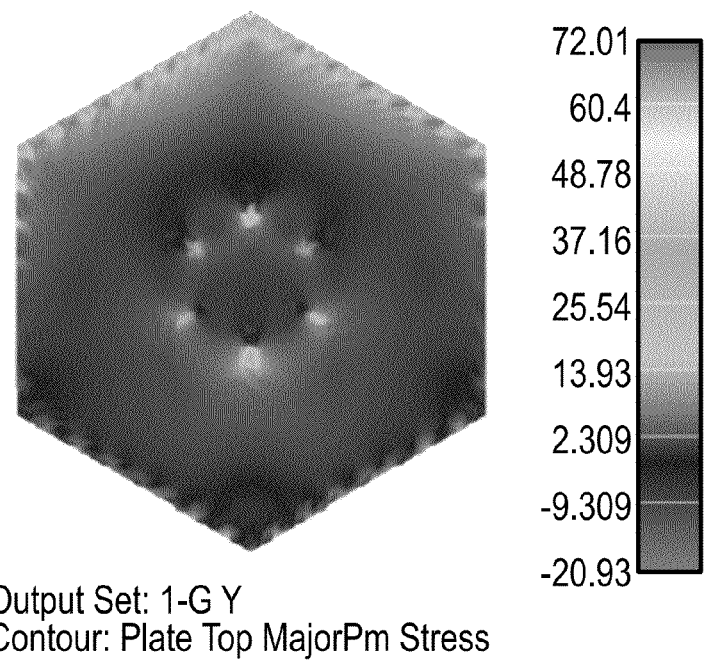
Figure 30:
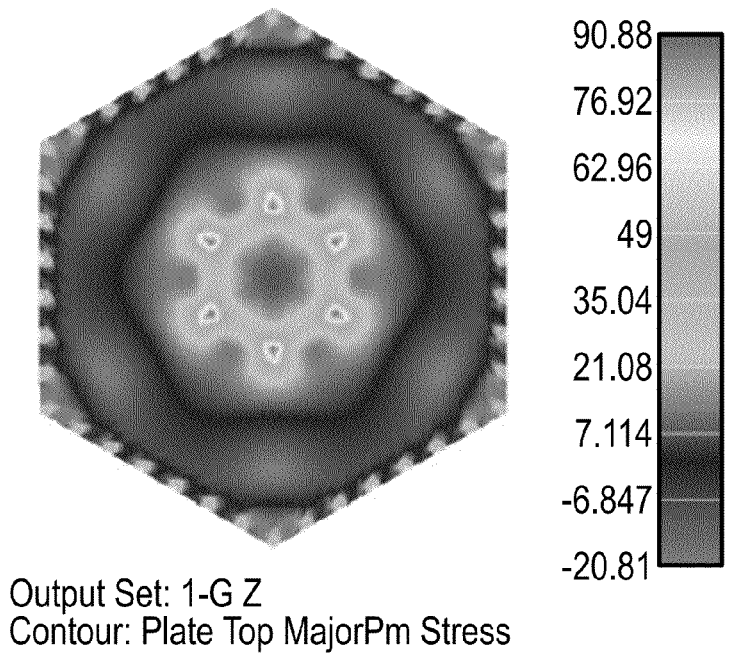

The ULE substrate has positive stress margin of safety under 13+g's axial and 16+ g's lateral for a ULE substrate (see FIG. 28, FIG. 29 and FIG. 30 for stress under 1-G in the X, Y and Z directions, respectively). Peak stress is localized at actuator interface locations. Tailoring of the local interface pad design will decrease stress. Significantly higher load capability is possible if required.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. A method of forming an aspheric mirror, comprising:
manufacturing a mirror segment having a substantially spherical surface contour;
attaching actuator assemblies at a plurality of contact points along an outer edge of the mirror segment, wherein an actuator assembly includes a first pair of actuators for controlling a radial force and a tangential moment on the mirror segment at the contact point and a second pair of actuators for controlling an axial force and a radial moment on the mirror segment at the contact point; and
activating the actuator assemblies to apply a load to deform the mirror segment to a substantially aspheric surface contour, wherein the mirror segment includes a central hole that defines an inner edge of the mirror segment, further comprising attaching actuator assemblies at each of a plurality of contact points along the inner edge of the mirror segment and activating the actuator assemblies along the inner edge of the mirror segment.

2. The method of claim 1, wherein the load further includes a force.

3. The method of claim 2, wherein the force includes at least one of a radial force and an axial force and the moment includes at least one of a radial moment and a tangential moment.

4. The method of claim 3, wherein applying the loads further comprises applying the radial force, the axial force, the radial moment and the tangential moment substantially simultaneously at each of the plurality of contact points along the outer edge of the mirror.

5. The method of claim 4, further comprising applying the radial force, axial force, radial moment and tangential moment at each of the plurality of contact points via actuator assemblies located at each of the plurality of contact points along the outer edge of the mirror.

6. The method of claim 1, wherein the load applied at the plurality of contact points along the inner edge of the mirror segment includes at least one of a radial force, an axial force, a radial moment, and a tangential moment.

7. The method of claim 1, wherein the aspheric surface contour conforms substantially to an off-axis portion of a paraboloid.

8. The method of claim 5, wherein the manufactured mirror has a substantially cylindrical surface contour.

9. A mirror assembly, comprising:
a mirror segment having a substantially spherical surface contour in a relaxed state;
a plurality of actuator assemblies attached to the mirror segment at a plurality of contact points distributed substantially along an outer edge of the mirror segment, wherein an actuator assembly includes a first pair of actuators for controlling a radial force and a tangential moment on the mirror segment at the contact point and a second pair of actuators for controlling an axial force and a radial moment on the mirror segment at the contact point; and
a processor to activate each of the plurality of actuator assemblies to apply a load to deform the mirror segment to a substantially aspheric surface contour,
wherein the mirror segment includes a central hole that defines an inner edge of the mirror segment and a plurality of actuator assemblies are configured to apply a radial force, axial force, radial moment, and tangential moment substantially simultaneously at each of a plurality of contact points along the inner edge.

10. The mirror assembly of claim 9, wherein the load further includes a force.

11. The mirror assembly of claim 10, wherein the force includes at least one of a radial force and an axial force and the moment includes at least one of a radial moment and a tangential moment.

12. The mirror assembly of claim 11, wherein the plurality of actuators are coupled to a plurality of contact points along the outer edge of the mirror segment and are configured to apply the radial force, the axial force, the radial moment and the tangential moment substantially simultaneously.

13. The mirror assembly of claim 9, wherein the aspheric surface contour conforms substantially to an off-axis portion of a paraboloid.

14. The mirror assembly of claim 9, wherein the manufactured mirror segment has a substantially cylindrical surface contour.

15. A telescope, comprising:
a mirror segment having a substantially spherical surface contour in a relaxed state;
a plurality of actuator assemblies attached to the mirror segment at a plurality of contact points distributed substantially along an outer edge of the mirror segment, wherein an actuator assembly includes a first pair of actuators for controlling a radial force and a tangential moment on the mirror segment at the contact point and a second pair of actuators for controlling an axial force and a radial moment on the mirror segment at the contact point; and
a processor to activate each of the plurality of actuator assemblies to apply a load to deform the mirror segment to a substantially aspheric surface contour,
wherein the mirror segment includes a central hole that defines an inner edge of the mirror segment and a plurality of actuator assemblies are configured to apply a radial force, axial force, radial moment, and tangential moment substantially simultaneously at each of a plurality of contact points along the inner edge.

16. The telescope of claim 15, wherein the applied load further includes a linear force.

17. The telescope of claim 16, wherein the force includes at least one of a radial force and an axial force and the moment includes at least one of a radial moment and a tangential moment.

18. The telescope of claim 17, wherein the plurality of actuators are coupled to a plurality of contact points along the outer edge of the mirror and are configured to apply the radial force, the axial force, the radial moment and the tangential moment substantially simultaneously.

19. The telescope of claim 15, wherein the aspheric surface contour conforms substantially to an off-axis portion of a paraboloid.

20. The telescope of claim 15, wherein the manufactured mirror has a substantially cylindrical surface contour.

* * * * *